(12) United States Patent
Yanagisawa et al.

(10) Patent No.: US 8,059,757 B2
(45) Date of Patent: Nov. 15, 2011

(54) SIGNAL PROCESSING DEVICE AND METHOD

(75) Inventors: Kiyoshi Yanagisawa, Tokyo (JP); Noriaki Matsuno, Tokyo (JP)

(73) Assignee: NEC Corporation, Tokyo (JP)

( * ) Notice: Subject to any disclaimer, the term of this patent is extended or adjusted under 35 U.S.C. 154(b) by 997 days.

(21) Appl. No.: 11/993,259

(22) PCT Filed: Jun. 20, 2006

(86) PCT No.: PCT/JP2006/312299
§ 371 (c)(1),
(2), (4) Date: Dec. 20, 2007

(87) PCT Pub. No.: WO2006/137387
PCT Pub. Date: Dec. 28, 2006

(65) Prior Publication Data
US 2008/0159367 A1    Jul. 3, 2008

(30) Foreign Application Priority Data

Jun. 21, 2005    (JP) .................................. 2005-180636

(51) Int. Cl.
*H04L 25/06* (2006.01)
(52) U.S. Cl. .......... 375/319; 375/317; 375/316; 329/347
(58) Field of Classification Search ................... 375/319
See application file for complete search history.

(56) References Cited

U.S. PATENT DOCUMENTS

| | | | | |
|---|---|---|---|---|
| 4,399,408 A | * | 8/1983 | Froese et al. | 324/76.44 |
| 4,399,409 A | * | 8/1983 | Thompson | 324/76.74 |
| 4,873,984 A | * | 10/1989 | Hunt et al. | 600/443 |
| 5,355,356 A | * | 10/1994 | Johann et al. | 369/59.15 |
| 5,583,934 A | * | 12/1996 | Zhou | 379/399.02 |
| 6,192,321 B1 | * | 2/2001 | Grumstrup et al. | 702/113 |
| 6,765,615 B1 | * | 7/2004 | Chen et al. | 348/312 |
| 2001/0010713 A1 | | 8/2001 | Yamamoto | |
| 2008/0089453 A1 | * | 4/2008 | Komatsu | 375/346 |

(Continued)

FOREIGN PATENT DOCUMENTS

JP    06-165122 A    6/1994

(Continued)

OTHER PUBLICATIONS

International Search Report of PCT/JP2006/312299 filed Jun. 20, 2006, date of mailing Aug. 22, 2006.

(Continued)

*Primary Examiner* — Chieh M Fan
*Assistant Examiner* — Santiago Garcia
(74) *Attorney, Agent, or Firm* — Young & Thompson

(57) ABSTRACT

A test signal is generated and supplied to a signal processing circuit for making frequency conversion. A signal outputted from the signal processing circuit is detected to generate a detected signal including a detected positive signal corresponding to the positive signal of the test signal and a detected negative signal corresponding to the negative signal. And the level of the detected positive signal and the level of the detected negative signal are compared to output the comparison result indicating which level is higher. Further, an offset correction signal for making a level difference between the detected positive signal and the detected negative signal within a preset permissible range is generated, based on the comparison result, and offset correction of the test signal or modulated signal supplied from the outside is made in accordance with the offset correction signal.

9 Claims, 18 Drawing Sheets

U.S. PATENT DOCUMENTS

2010/0239056 A1 * 9/2010 Matsuno et al. .............. 375/346

FOREIGN PATENT DOCUMENTS

| | | |
|---|---|---|
| JP | 07-203154 A | 8/1995 |
| JP | 09-247137 A | 9/1997 |
| JP | 09-266499 A | 10/1997 |
| JP | 09-270827 A | 10/1997 |
| JP | 09-321631 A | 12/1997 |
| JP | 10-172238 A | 6/1998 |
| JP | 11-332083 A | 11/1999 |
| JP | 2000-022458 A | 1/2000 |
| JP | 2001-245139 A | 9/2001 |
| JP | 2001-285387 A | 10/2001 |
| JP | 2002-026700 A | 1/2002 |
| JP | 2002-071466 A | 3/2002 |
| JP | 2004-221653 A | 8/2004 |
| JP | 2004-228836 A | 8/2004 |
| JP | 2005-020119 A | 1/2005 |
| JP | 2005-020120 A | 1/2005 |
| JP | 2005-020121 A | 1/2005 |

OTHER PUBLICATIONS

Written Opinion of the International Searching Authority, Jan. 10, 2008.

* cited by examiner

[Fig.1]
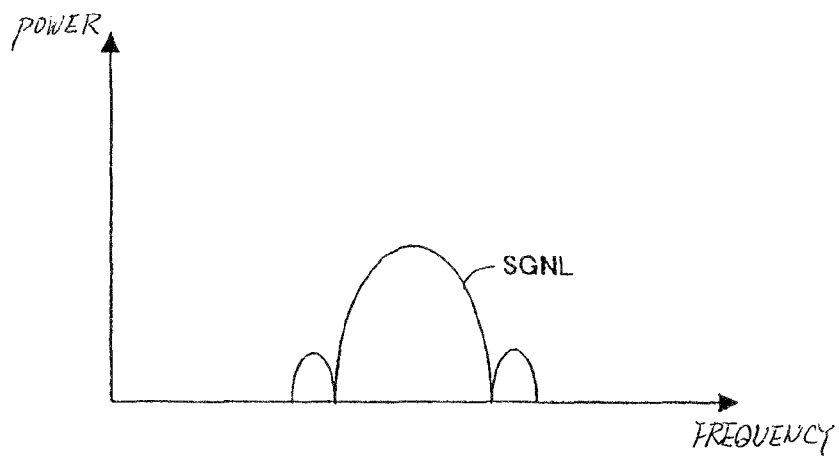
[Fig.2]
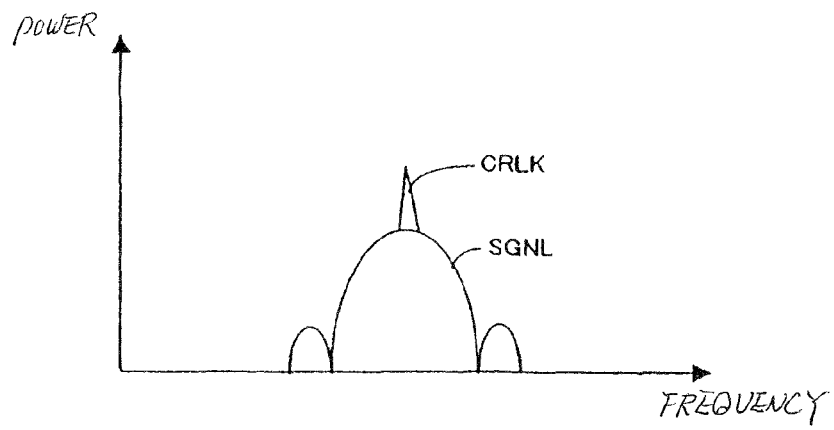
[Fig.3]
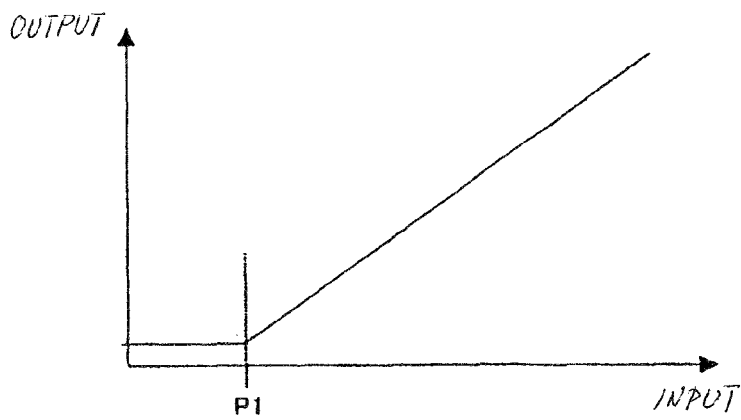

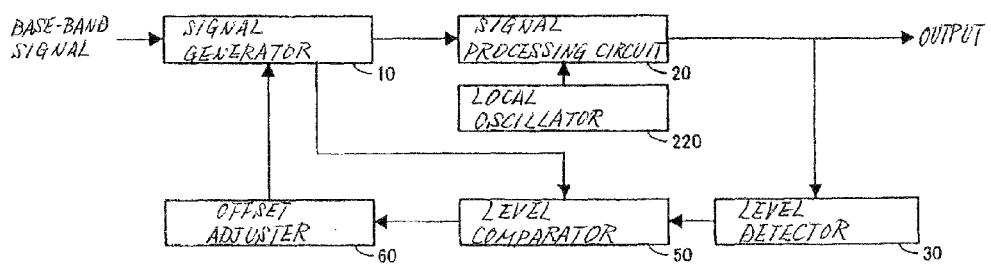
[Fig. 4]
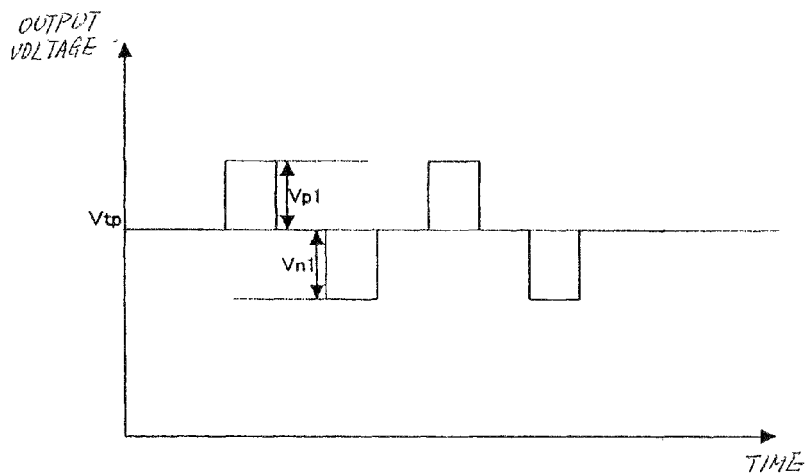
[Fig. 5]
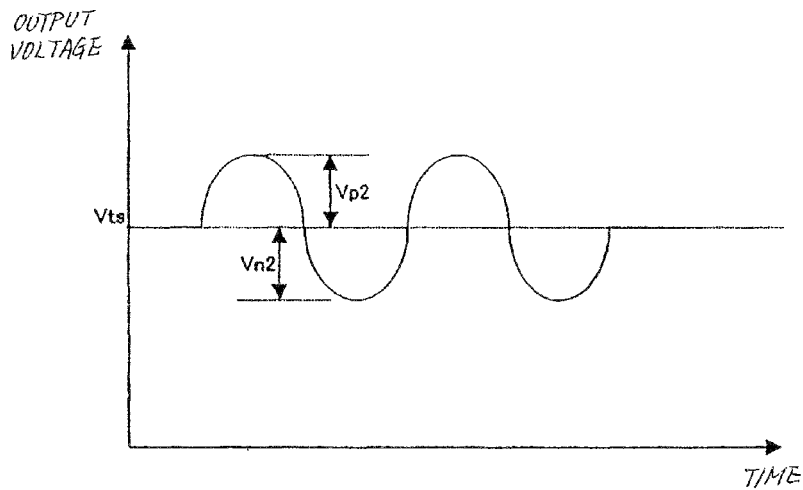
[Fig. 6]

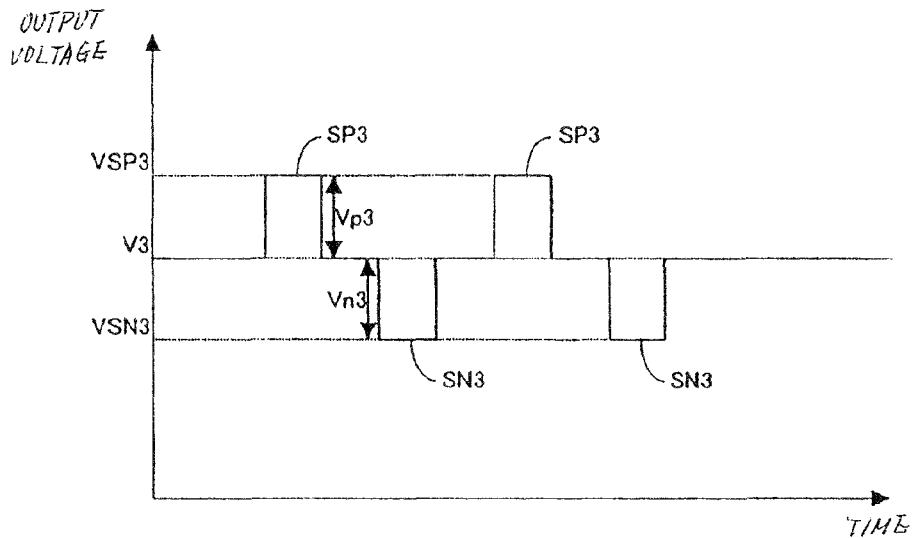
[Fig. 7]
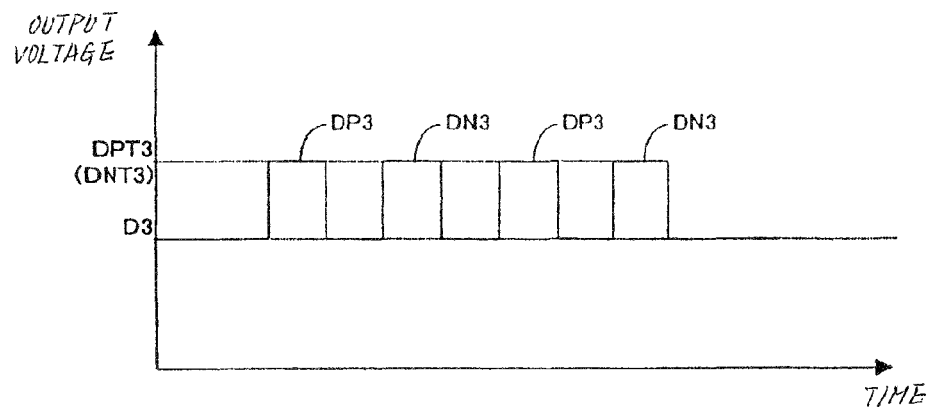
[Fig. 8]

[Fig.9]
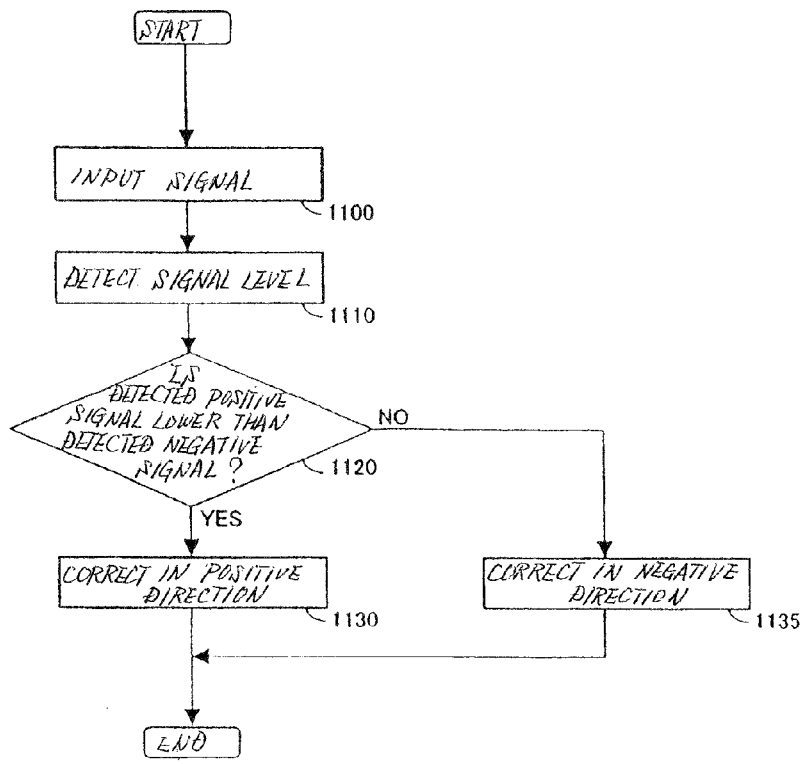
[Fig.10]
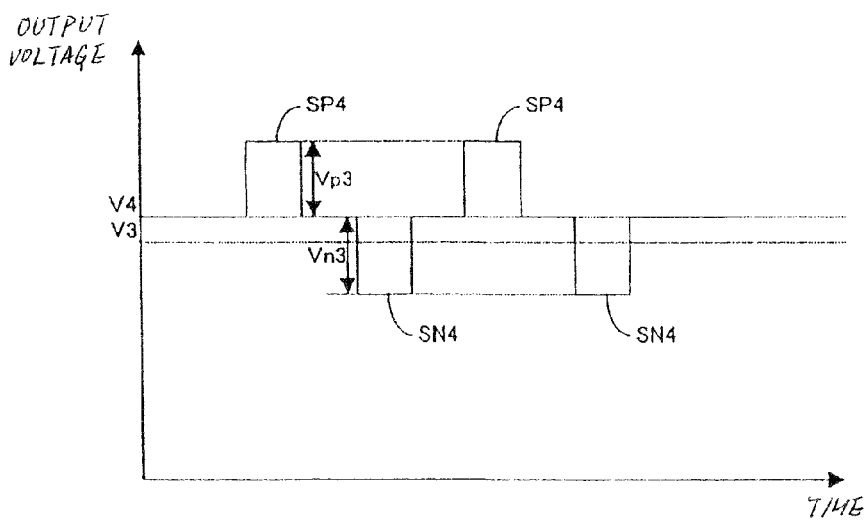

[Fig.11]
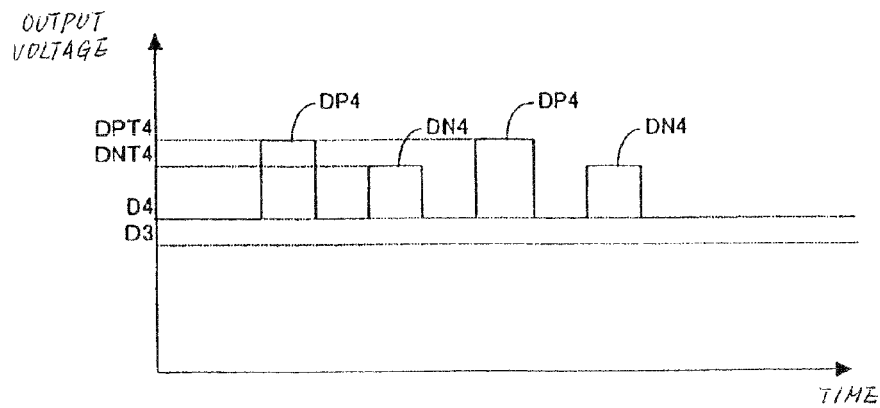
[Fig.12]
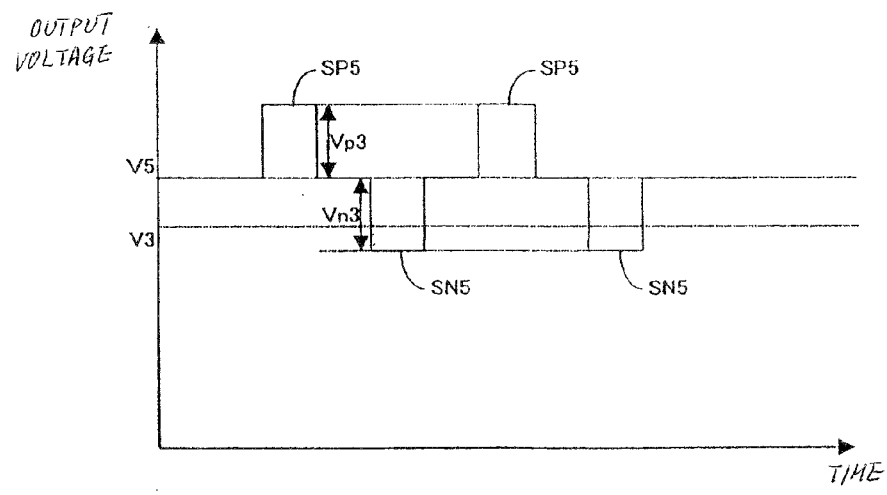
[Fig.13]
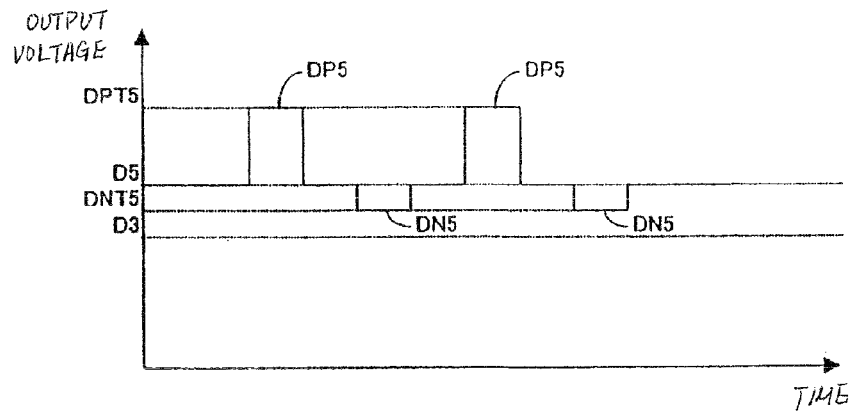

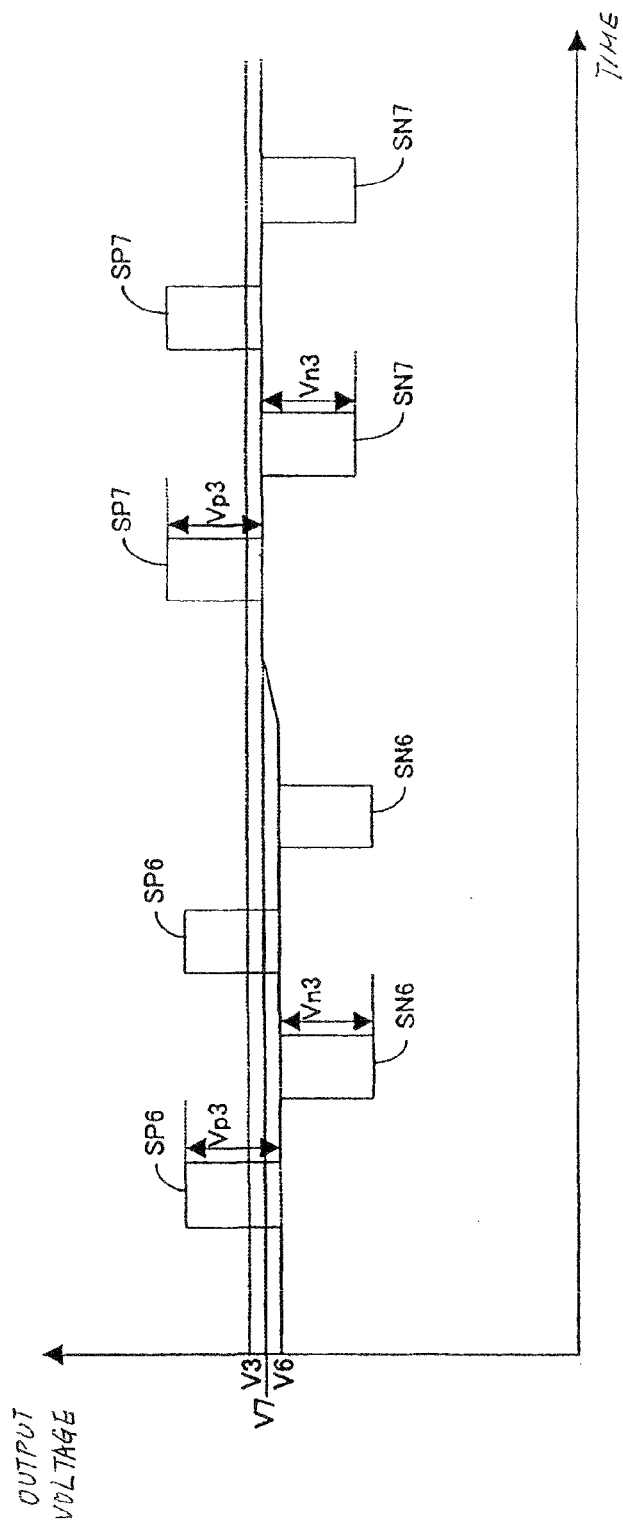
[Fig.14]

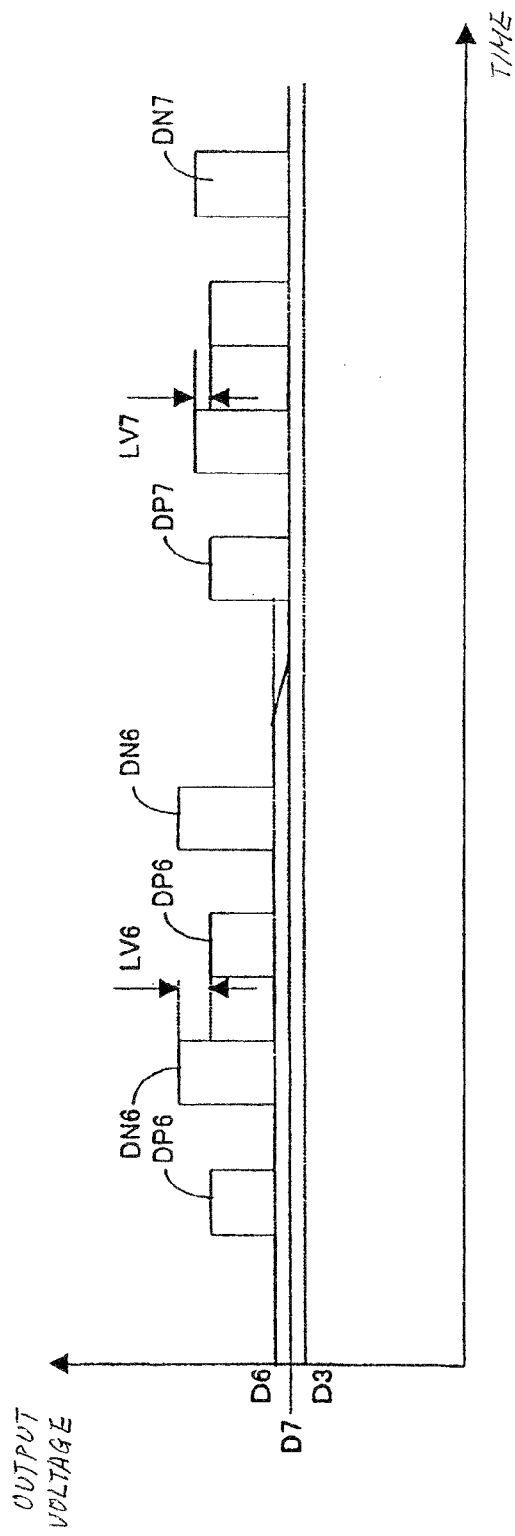
[Fig. 15]

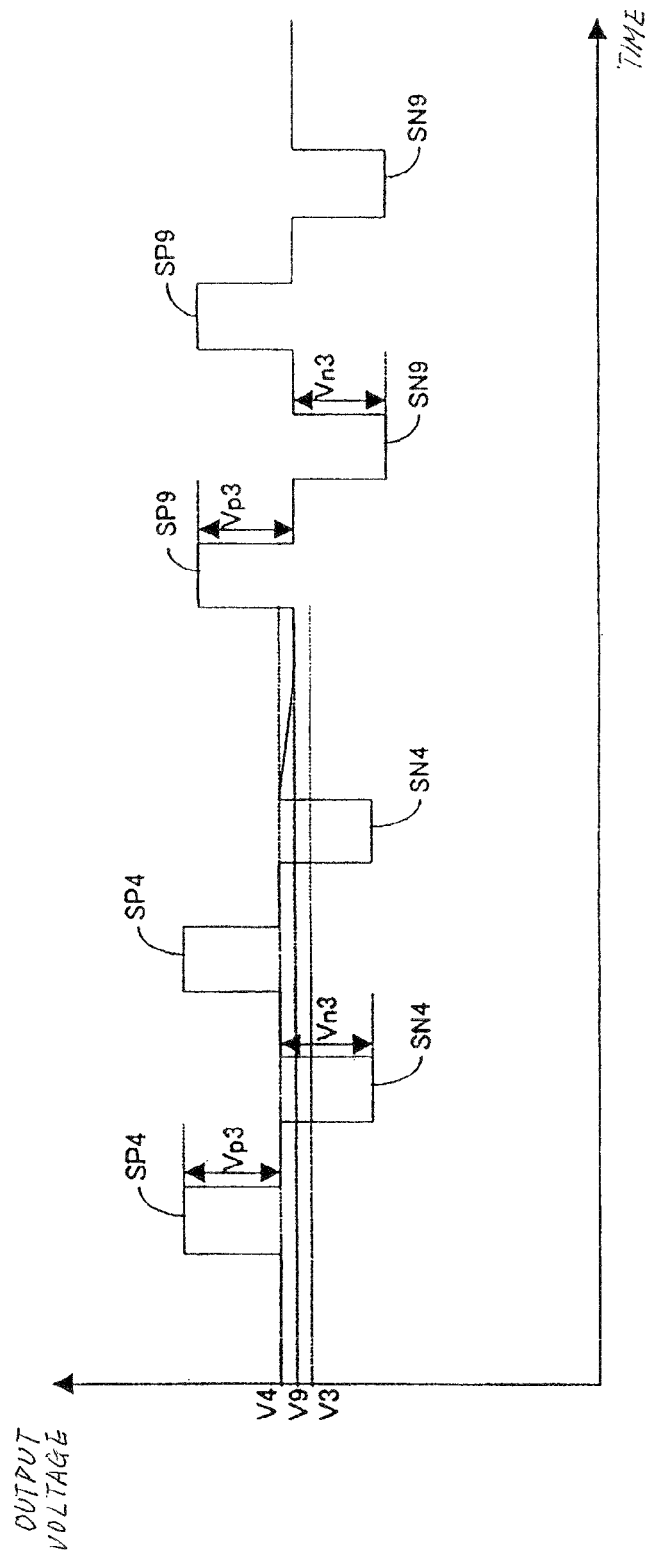
[Fig. 16]

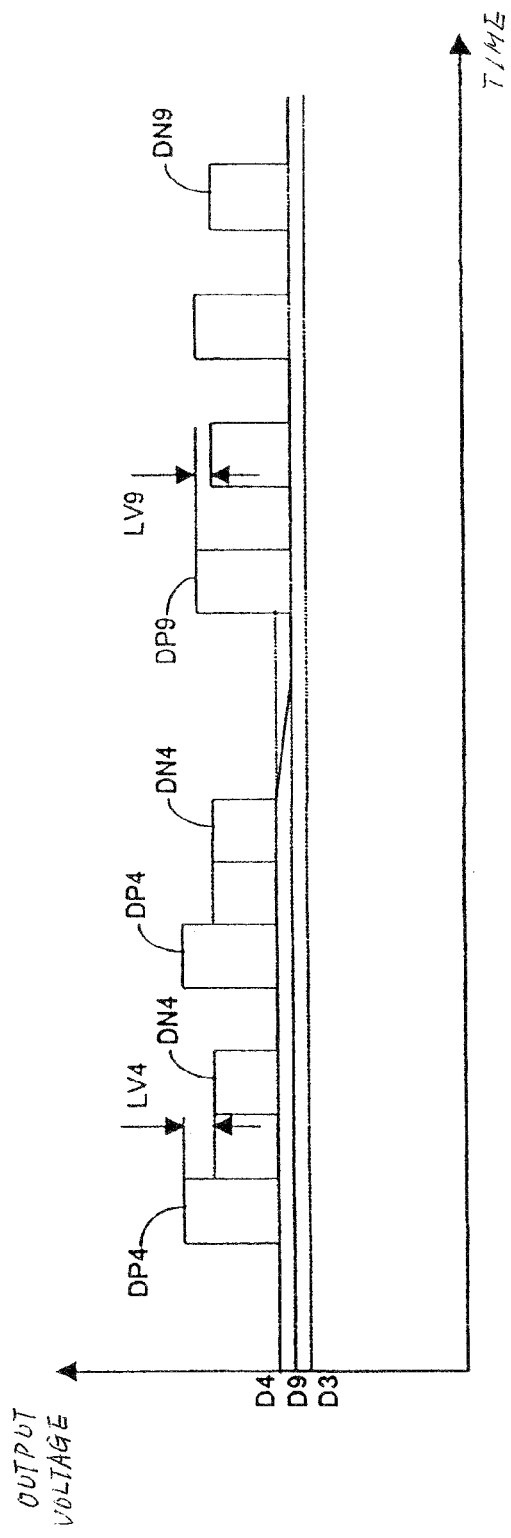
[Fig.17]

[Fig.18]
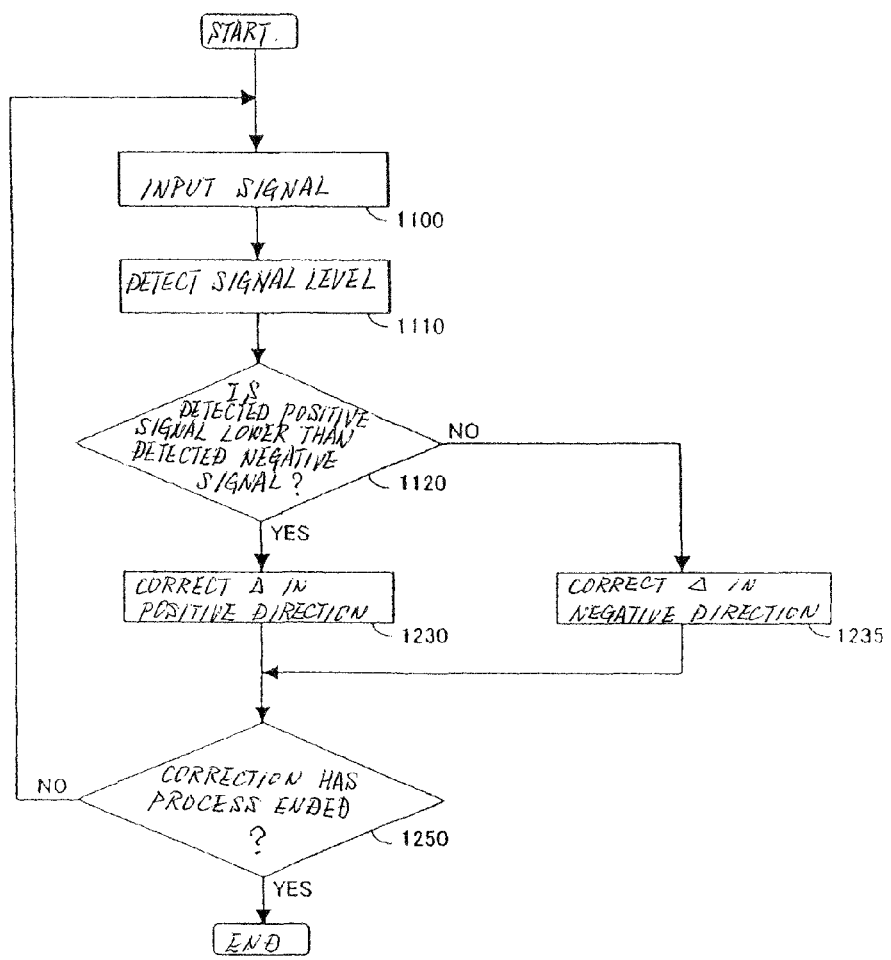

[Fig.19]
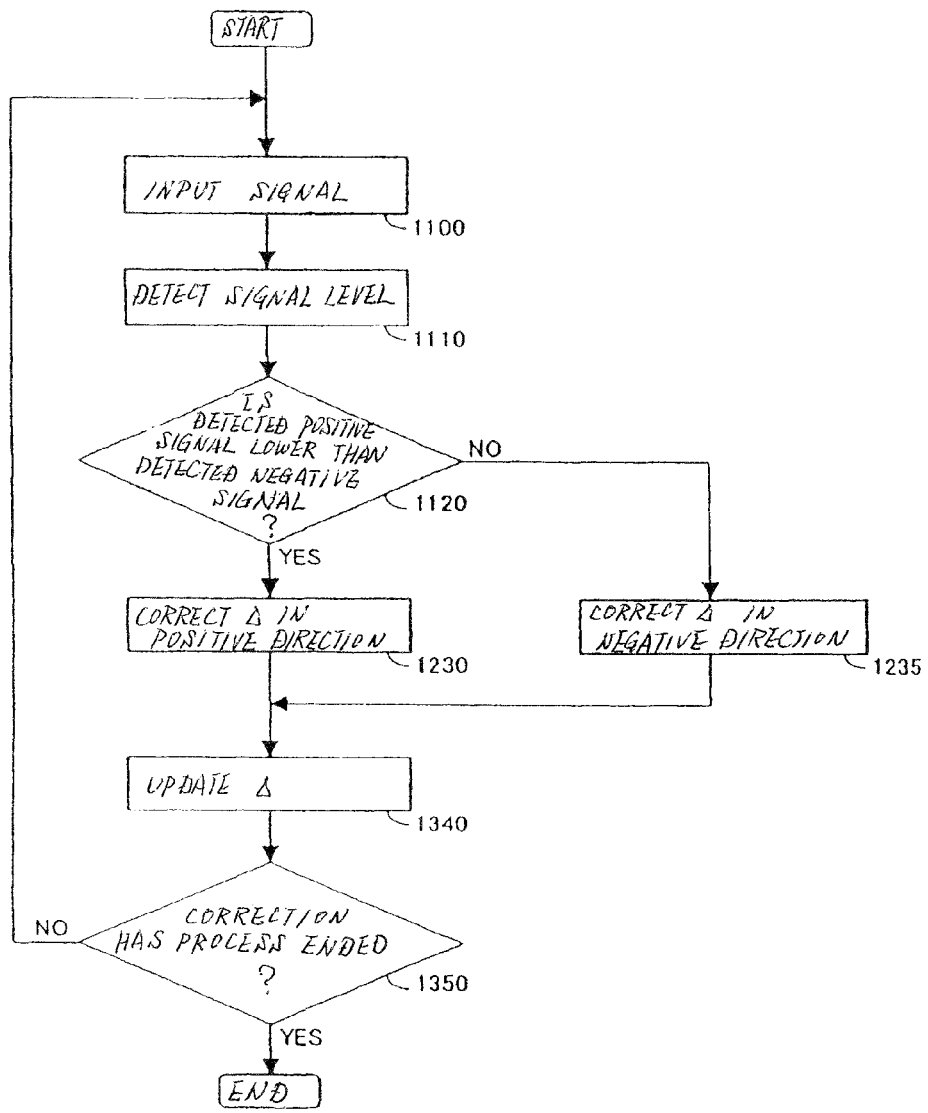

[Fig.20]
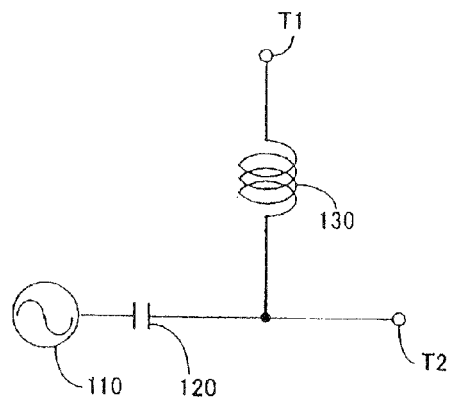
[Fig.21]
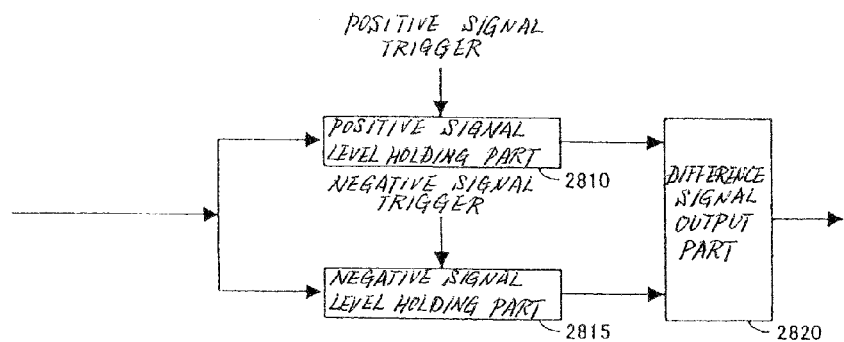
[Fig.22]
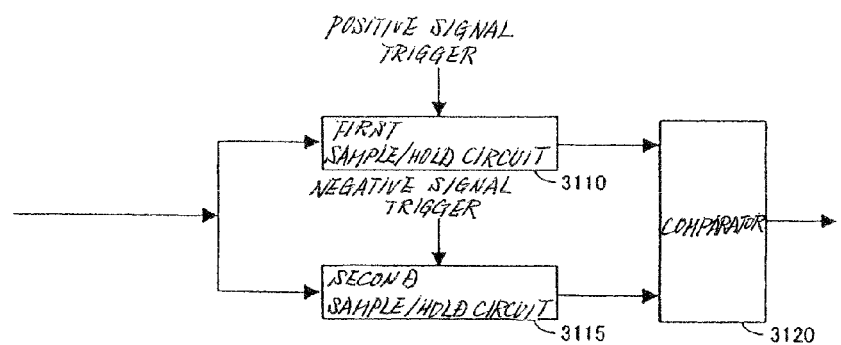

[Fig. 23]
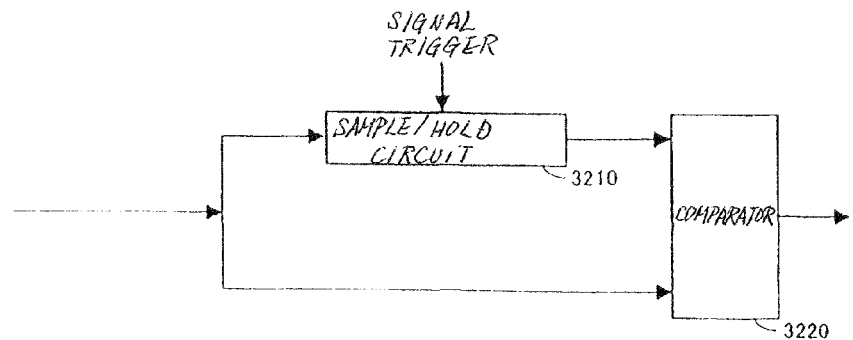
[Fig. 24]
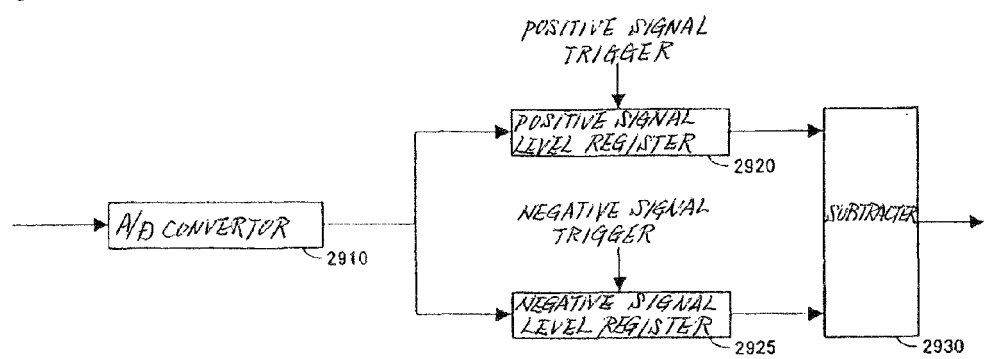
[Fig. 25]
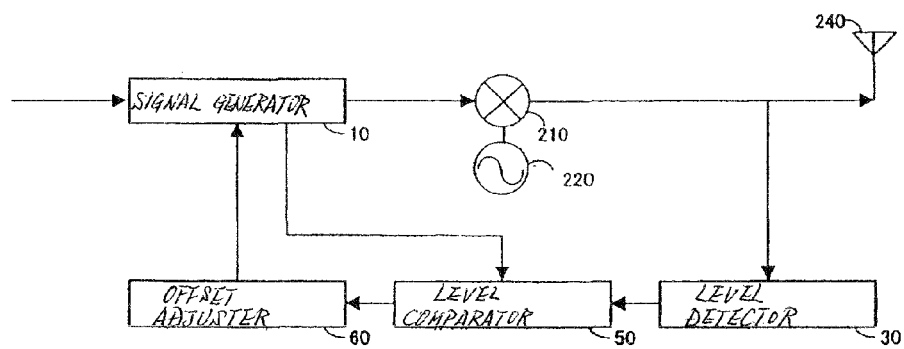

[Fig. 26]
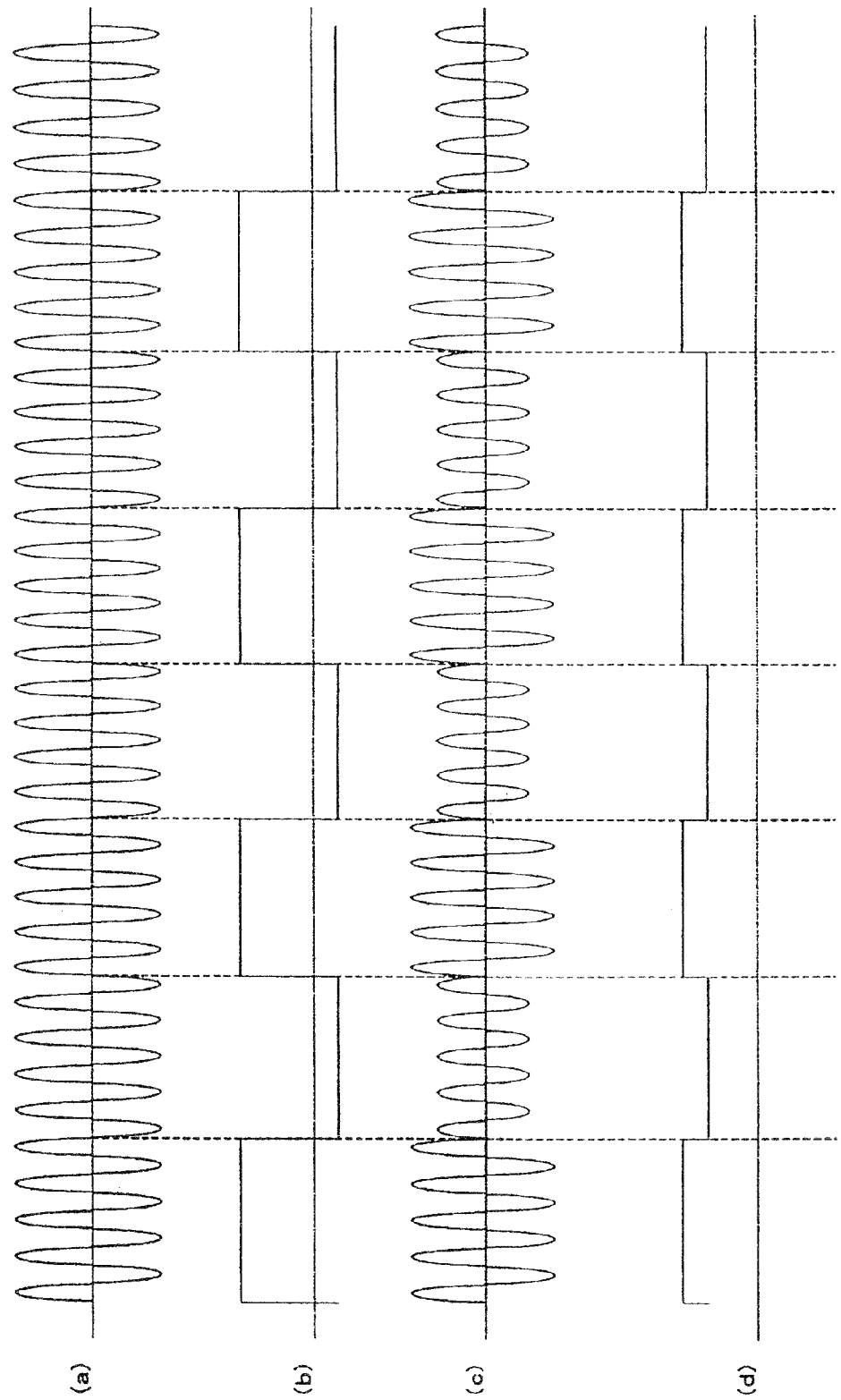

[Fig. 27]
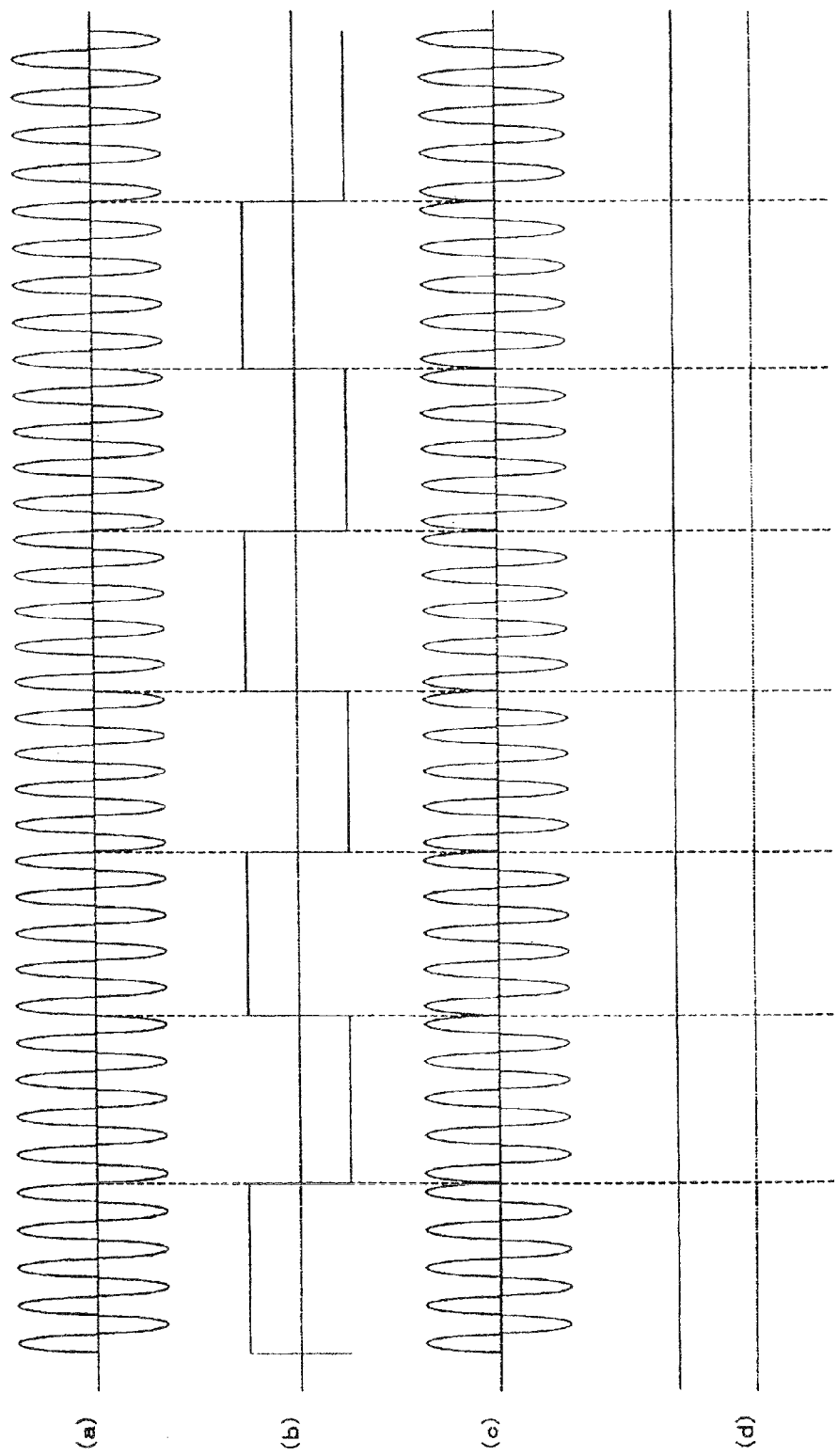

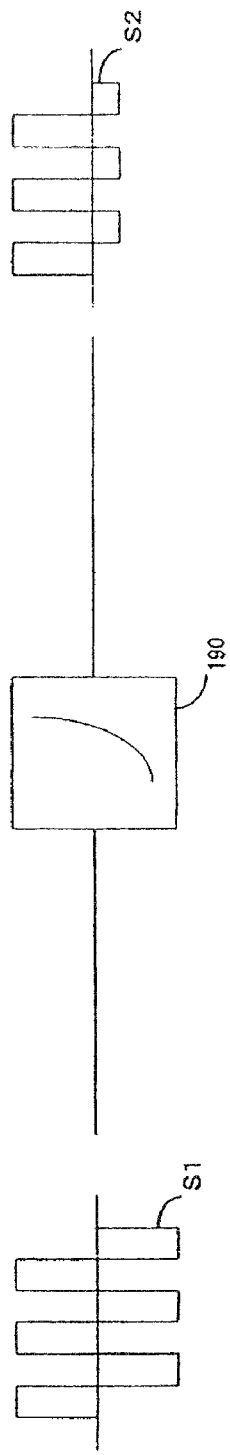
[Fig.28]

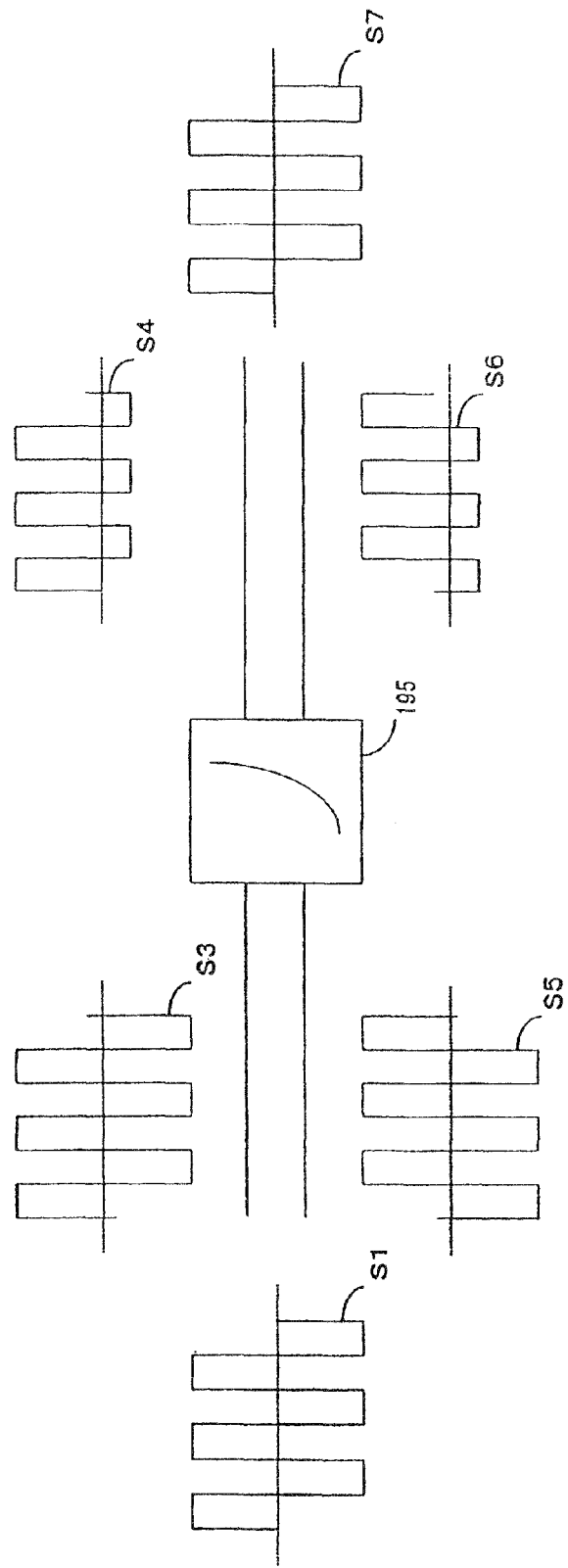
[Fig. 29]

[Fig.30]
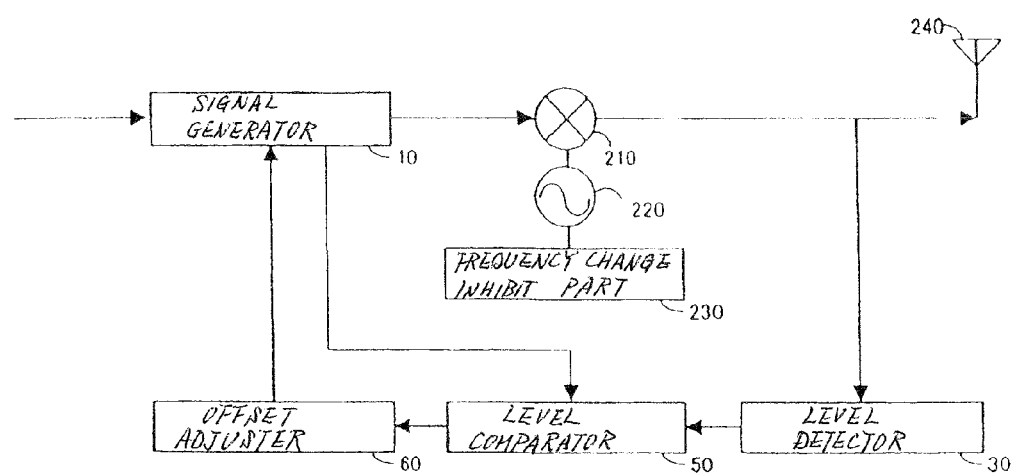
[Fig.31]
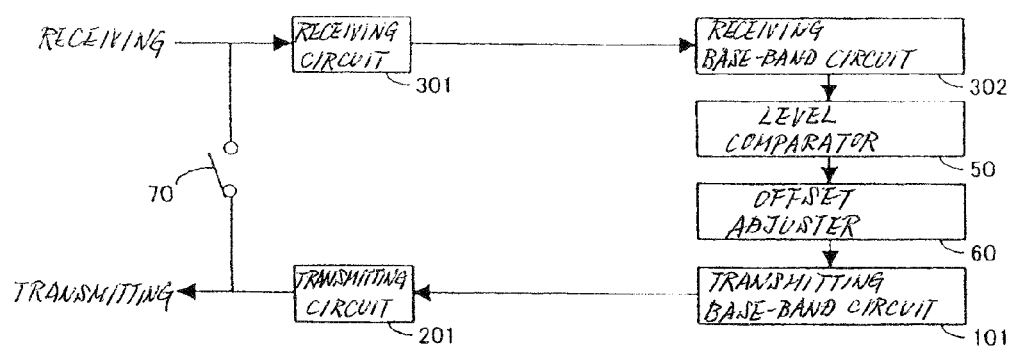

SIGNAL PROCESSING DEVICE AND METHOD

TECHNICAL FIELD

The present invention relates to a signal processing device and method for correcting a DC shift component of a high frequency signal.

BACKGROUND ART

In a transmitter provided for a communication system or communication terminal, a base-band signal including user data is converted into a radio frequency signal by a signal processing device having a mixer and a power amplifier, and transmitted after amplifying the signal power, as needed.

Herein, if a DC (Direct Current) shift component exists in the base-band signal inputted into the mixer, the mixer outputs a radio frequency (RF: Radio Frequency) signal including a carrier leak caused by the DC shift component.

When the carrier leak occurs, the signal waveform of the radio frequency signal outputted from the mixer is deviated from the ideal waveform, deteriorating the EVM (Error Vector Magnitude: Modulation Accuracy) of the radio frequency signal.

Therefore, a spectrum analyzer was conventionally employed to monitor the frequency spectrum of the radio frequency signal and detect whether or not the carrier leak was contained in the radio frequency signal. And when the carrier leak was detected, an offset adjustment was made to minimize the DC shift component in a base-band circuit for generating the base-band signal, for example.

The relationship between the DC shift component of the base-band signal and the carrier leak contained in the radio frequency signal to be transmitted will be described below in detail.

The mixer mixes the inputted base-band signal and a local signal of predetermined frequency generated by a local signal generator to convert the base-band signal into the radio frequency signal. The radio frequency signal that is frequency converted by the mixer is amplified by a power 15 amplifier, and transmitted from an aerial wire (antenna device). Then, an ideal transmitting signal Pout without DC shift component can be represented in the following expression (1).

$$\text{Pout} = A(t) \cdot \sin(\omega t) \tag{1}$$

where A(t) denotes the base-band signal, and $\sin(\omega t)$ denotes the local signal. A frequency spectrum of this transmitting signal Pout is shown in FIG. 1. The transverse axis of FIG. 1 represents the frequency and the longitudinal axis represents the power of signal component SGNL at each frequency.

Herein, it is supposed that the base-band signal inputted into the mixer is an I/Q (In-phase/Quadrature-phase) signal. If this I/Q signal contains a DC shift component B, the transmitting signal Pout is translated into the following expression (2).

$$\text{Pout} = A(t) \cdot \sin(\omega t) + B \sin(\omega t) \tag{2}$$

As will be apparent from the expression (2), the carrier leak $B \sin(\omega t)$ caused by DC shift component B appears in the transmitting signal Pout.

FIG. 2 shows an example of the frequency spectrum of the transmitting signal Pout containing the carrier leak caused by the DC shift component B.

The transverse axis of FIG. 2 represents the frequency and the longitudinal axis represents the power of signal component SGNL at each frequency.

The transmitting signal Pout contains the carrier leak CRLK caused by the DC shift component B, which is superimposed on the normal signal component SGNL, as shown in FIG. 2. It is well known that such carrier leaks caused by the DC shift component deteriorates the EVM of the radio frequency signal used in the communication system and degrades the communication quality, as described above.

It is well known that the carrier leak is similarly caused by the DC shift component in the circuits such as a power amplifier, a phase converter and a frequency selector, for example, other than the mixer provided for the signal processing device, whereby the carrier leak caused by the DC shift component in the circuits other than the mixer also degrades the communication quality. Thus, it is necessary to make the DC shift component ideally zero to suppress a degradation in the communication quality in the communication system.

In the conventional communication system as described above, this carrier leak was detected using the spectrum analyzer, and the offset adjustment was made by the base-band circuit to minimize the carrier leak, suppressing the carrier leak.

A negative feedback amplifier of the Cartesian loop type that operates stably by adjusting the DC shift component inputted into a quadrature modulator to reduce a degradation in the communication quality was proposed in Japanese Patent Laid-Open No. 10-136048.

By the way, when the carrier leak is not measured using the spectrum analyzer, it is instead necessary to have a detection circuit for detecting the power of the DC shift component contained in the transmitting signal. Generally, a well-known wave detector circuit is used for this type of detection circuit. However, there is a problem that the wave detector circuit can only correctly detect a signal having a certain power or more due to fluctuating circuit parameters.

FIG. 3 shows the input/output characteristics of the typical wave detector circuit. The transverse axis of FIG. 3 represents the input power of the wave detector circuit and the longitudinal axis represents the output power of the wave detector circuit.

The typical wave detector circuit has output power that does not change until the input signal reaches a predetermined power P1, and outputs a signal whose power depends on the input signal provided that the input signal exceeds power P1, as shown in FIG. 3.

The DC shift component is usually smaller than the power of the base-band signal, and often has a smaller value than the predetermined power P1 as shown in FIG. 3. Therefore, to directly detect the DC shift component with the wave detector circuit having an input/output characteristic as shown in FIG. 3, it is necessary to amplify a signal to detect the object with a high gain amplifier and supply it to the wave detector circuit. In particular, when the power of the radio frequency signal is detected, a power amplifier for a high frequency signal is required, resulting in a problem that the configuration of the detection circuit becomes complex. Also, if the detection circuit is provided with the high gain power amplifier for a high frequency signal, there is a problem that the circuit scale will become larger, and the power consumption will increase.

DISCLOSURE OF THE INVENTION

Thus, it is an object of the present invention to provide a signal processing device and method that can detect the DC shift component without using a spectrum analyzer or a power amplifier for detection.

Also, it is another object of the invention to provide a signal processing device and method that can correct the detected DC shift component.

In order to accomplish the above object, a test signal including a positive signal having a first amplitude in a direction where the voltage is higher than a preset reference voltage and a negative signal having a second amplitude that is the same as the first amplitude in a direction where the voltage is lower than the reference voltage is generated and supplied to a signal processing circuit for making the frequency conversion of a modulated signal. And a signal outputted from the signal processing circuit is detected to generate a detected signal including a detected positive signal corresponding to the positive signal and a detected negative signal corresponding to the negative signal, and the level of the detected positive signal and the level of the detected negative signal are compared to output the comparison result indicating which level of the detected positive signal and the detected negative signal is higher.

In this case, if the test signal does not contain the DC shift component, the level of the detected positive signal and the level of the detected negative signal are equal, whereas if the test signal contains the DC shift component, the level of the detected positive signal and the level of the detected negative signal are different, though the first amplitude and the second amplitude of the test signal are equal. Thus, the DC shift component of the test signal is detected by comparing the level between the detected positive signal and the detected negative signal. The DC shift component detected at this time is equal to the DC shift component superimposed on the modulated signal by the signal processing device. Accordingly, the DC shift component of the modulated signal can be detected without using a spectrum analyzer or a power amplifier for detection.

Also, in this invention, an offset correction signal for making a level difference between the detected positive signal and the detected negative signal within a preset permissible range is generated, based on the comparison result of the level comparator, and the offset of the modulated signal supplied from the outside is corrected in accordance with the offset correction signal. Therefore, the DC shift component of the modulated signal can be corrected with a simple configuration. Accordingly, it is possible to obtain a communication system that has excellent communication quality in which there is reduced carrier leakage in the transmitted signal by using the signal processing device of the invention.

BRIEF DESCRIPTION OF THE DRAWINGS

FIG. 1 is a graph showing one example of the frequency spectrum of a transmitting signal where there is no carrier leak;

FIG. 2 is a graph showing one example of the frequency spectrum of a transmitting signal where there is a carrier leak;

FIG. 3 is a graph showing the input/output characteristic of a typical wave detector circuit;

FIG. 4 is a block diagram showing one configuration example of a signal processing device according to the invention;

FIG. 5 is a waveform view showing one example of a test signal including a pulse signal;

FIG. 6 is a waveform view showing one example of a test signal including a sinusoidal signal;

FIG. 7 is a waveform view showing one example of a test signal containing no DC shift component;

FIG. 8 is a waveform view showing one example of a detected signal obtained from the high frequency signal that is frequency converted from the test signal as shown in FIG. 7;

FIG. 9 is a flowchart showing one example of a procedure for the signal processing device according to the invention;

FIG. 10 is a waveform view showing one example of a test signal on which a DC shift component is superimposed;

FIG. 11 is a waveform view showing one example of a detected signal obtained from the high frequency signal that is frequency converted from the test signal as shown in FIG. 10;

FIG. 12 is a waveform view showing one example of a test signal on which a large DC shift component is superimposed;

FIG. 13 is a waveform view showing one example of a detected signal obtained from the high frequency signal that is frequency converted from the test signal as shown in FIG. 12;

FIG. 14 is a waveform view showing one example of a test signal before and after correcting the DC shift component in the negative direction;

FIG. 15 is a waveform view showing one example of a detected signal before and after correcting the DC shift component in the negative direction as shown in FIG. 14;

FIG. 16 is a waveform view showing one example of a test signal before and after correcting the DC shift component in the positive direction;

FIG. 17 is a waveform view showing one example of a detected signal before and after correcting the DC shift component in the positive direction as shown in FIG. 16;

FIG. 18 is a flowchart showing a procedure for making the offset correction in units of minute amount Δ;

FIG. 19 is a flowchart showing a procedure for making the offset correction in units of minute amount Δ and updating the minute amount Δ;

FIG. 20 is a circuit diagram showing an example of a signal generator as shown in FIG. 4;

FIG. 21 is a block diagram showing an example of a level comparator as shown in FIG. 4;

FIG. 22 is a block diagram showing a specific example of the level comparator as shown in FIG. 21;

FIG. 23 is a block diagram showing another example of the level comparator as shown in FIG. 4;

FIG. 24 is a block diagram showing another example of the level comparator as shown in FIG. 4;

FIG. 25 is a circuit diagram showing an example of a signal processing circuit as shown in FIG. 4;

FIG. 26 is a waveform view showing a signal waveform before the offset correction processed by the signal processing device as shown in FIG. 25;

FIG. 27 is a waveform view showing a signal waveform after the offset correction processed by the signal processing device as shown in FIG. 25;

FIG. 28 is a waveform view showing one example of a test signal inputted or outputted into a non-linear circuit;

FIG. 29 is a waveform view showing one example of a test signal generated using a differential circuit;

FIG. 30 is a block diagram showing a variation example of the signal processing device as shown in FIG. 25; and FIG. 31 is a block diagram showing one configuration example of a communication system having a signal processing device according to the invention.

BEST MODE FOR CARRYING OUT THE INVENTION

A signal processing device of the present invention comprises signal generator 10 for generating a test signal as well as correcting a DC shift component of the test signal or a modulated signal, local signal generator (hereinafter referred to as local oscillator) 220 for generating a local oscillation signal of a predetermined frequency, signal processing circuit 20 for making the frequency conversion and power amplification using the local oscillation signal generated by local oscillator 220, with the test signal or a base-band signal as the input, level detector 30 for detecting the power (level) of an output signal from signal processing circuit 20, level comparator 50 for comparing the positive or negative level of the output signal from signal processing circuit 20 detected by level detector 30 with zero level, and offset adjuster 60 for generating an offset correction signal for correcting the DC shift component contained in the output signal from signal processing circuit 20, based on the comparison result of level comparator 50, as shown in FIG. 4.

Signal generator 10 generates a test signal, and corrects a DC shift component superimposed on the test signal and a base-band signal (modulated signal) supplied from a base-band circuit, not shown, in accordance with an offset correction signal outputted from offset adjuster 60.

The test signal generated in signal generator 10 includes a positive signal having a first amplitude in a direction (positive direction) in which the voltage is higher than a preset reference voltage and a negative signal having a second amplitude that is the same as the first amplitude in a direction (negative direction) in which the voltage is lower than the reference voltage.

The base-band signal to process the object by the signal processing device, like the test signal, includes a positive signal having a predetermined amplitude in the positive direction than a preset reference voltage and a negative signal having a predetermined amplitude in the negative direction than the reference voltage, in which the amplitude of the positive signal and the amplitude of the negative signal are equal.

Generally, since the amplitude of the base-band signal is small, there is less difference between the amplitude of the base-band signal and that of the DC shift component, even if the DC shift component is contained in the base-band signal inputted into the signal processing device, whereby it is difficult to detect the minute DC shift component contained in the base-band signal using a wave detector circuit.

On the contrary, the amplitude of the test signal can be set to be larger than the typical DC shift component, and can be easily detected using the wave detector circuit. Therefore, in this invention, the test signal is employed instead of the base-band signal in correcting the DC shift component.

The specific examples of this test signal are shown in FIGS. 5 and 6.

FIG. 5 is an example using a pulse signal for the test signal and FIG. 6 is an example using a sinusoidal signal for the test signal. In FIGS. 5 and 6, the transverse axis represents the time and the longitudinal axis represents the output voltage.

The test signal as shown in FIG. 5 includes a pulsed positive signal having a first amplitude Vp1 in the positive direction than a preset reference voltage Vtp and a pulsed negative signal having a second amplitude Vn1 in the negative direction than the reference voltage Vtp, in which the amplitude Vp1 and the amplitude Vn1 are equal.

The test signal as shown in FIG. 6 includes a sinusoidal positive signal having an amplitude Vp2 in the positive direction than a preset reference voltage Vts and a sinusoidal negative signal having an amplitude Vn2 in the negative direction than the reference voltage Vts, in which the amplitude Vp2 and the amplitude Vn2 are equal.

For the test signal, it is necessary that the amplitude of the positive signal and the amplitude of the negative signal with respect to the reference voltage (or reference current) are equal, irrespective of the occurrence order or the interval of the positive signal and the negative signal. Also, the test signal may have any waveform if the signal waveform of the positive signal and the signal waveform of the negative signal are the same, and is not limited to the pulse signal as shown in FIG. 5 and the sinusoidal signal as shown in FIG. 6.

Signal processing circuit 20 has various high frequency circuits, including, for example, a frequency converter such as a mixer or frequency multiplier, a power amplifier, an attenuator including a resistor, a phase converter, a frequency filter, and a waveform synthesizer for synthesizing the waveform of input signals. In this exemplary embodiment, the output signal of this signal processing circuit 20 is the output signal of the signal processing device according to the invention.

Level detector 30 outputs a detected signal indicating the power (level) of the output signal from signal processing circuit 20, using a well-known envelope detector, for example. The detected signal is composed of a detected positive signal corresponding to the positive signal of the test signal and a detected negative signal corresponding to the negative signal.

FIG. 8 shows one example of the detected signal outputted from level detector 30.

The detected signal as shown in FIG. 8 shows the signal obtained through the envelope detection from the high frequency signal which is frequency converted from the test signal as shown in FIG. 7. The test signal as shown in FIG. 7 is an example containing no DC shift component, and the detected signal as shown in FIG. 8 is an example in which the DC shift component is not superimposed on the test signal by the signal processing circuit. In FIGS. 7 and 8, the transverse axis represents the time and the longitudinal axis represents the output voltage.

The test signal as shown in FIG. 7 includes a pulsed positive signal SP3 having an amplitude Vp3 in the positive direction than a reference voltage V3 and a pulsed negative signal SN3 having an amplitude Vn3 in the negative direction than the reference voltage V3. The peak output voltage of this positive signal SP3 is VSP3, and the peak output voltage of the negative signal SP3 is VSN3. Also, the amplitude Vp3 of the positive signal SP3 and the amplitude Vn3 of the negative signal SN3 are equal.

The detected signal as shown in FIG. 8 includes detected positive signal DP3 from reference detection level D3 corresponding to reference voltage V3 of the test signal to detection level DPT3 corresponding to peak output voltage VSP3 of positive signal SP3 and detected negative signal DN3 from reference detection level D3 to detection level DNT3 corresponding to peak output voltage VSN3 of negative signal pulse SN3. Detection level DPT3 and detection level DNT3 of the detected signal as shown in FIG. 8 have equal value, because amplitude Vp3 of positive signal SP3 and amplitude Vp3 of negative signal SN3 of the test signal are equal.

Level comparator 50 compares the level (voltage) of the detected positive signal and the level (voltage) of the detected negative signal of the detected signal outputted from level detector 30, and outputs the difference in the voltage signal variance between them, or the determination result indicating which level of the detected positive signal and the detected negative signal is higher.

Offset adjuster 60 generates an offset correction signal for correcting the DC offset component superimposed on the test signal, based on the difference in the voltage signal variance between the detected positive signal and the detected negative signal outputted from level comparator 50, or the determination result. The offset correction signal generated by offset adjuster 60 is fed back to signal generator 10, and used for correcting the DC shift component.

Referring to FIGS. 9 to 19, the operation of the signal processing device according to the invention will be described below.

FIG. 9 is a flowchart showing one example of a procedure for the signal processing device according to the invention.

In the signal processing device of the invention as shown in FIG. 9, in correcting the DC shift component, a test signal generated in signal generator 10 is firstly inputted into signal processing circuit 20 (step 1100). Herein, FIG. 10 shows one example of the test signal containing the DC shift component and FIG. 11 shows one example of the detected signal. In FIGS. 10 and 11, the transverse axis represents the time and the longitudinal axis represents the output voltage.

The test signal as shown in FIG. 10 includes a pulsed positive signal SP4 having the amplitude Vp3 in the positive direction than the voltage V4 and a pulsed negative signal SN4 having the amplitude Vn3 in the negative direction than the voltage V4, in which the reference voltage is DC shifted to the voltage V4 in the positive direction. In the test signal as shown in FIG. 10, the amplitude Vp3 of the positive signal SP4 and the amplitude Vn3 of the negative signal SN4 are equal. The test signal as shown in FIG. 10 is processed through frequency conversion and power amplification in signal processing circuit 20 and outputted.

The high frequency signal outputted from signal processing circuit 20 is inputted into level detector 30. Level detector 30 detects the envelope for the level of the high frequency signal, and outputs the detected signal as shown in FIG. 11 (step 1110).

For the detected signal as shown in FIG. 11, the reference detection level transfers to the detection level D4, because the reference voltage of the test signal (see FIG. 10) is DC shifted. Therefore, even if amplitude Vp3 of positive signal SP4 of the test signal and amplitude Vn3 of negative signal SN4 are equal, detection level DPT4 corresponding to positive signal SP4 is greater than detection level DNT4 corresponding to negative signal SN4.

FIG. 12 shows one example of the test signal on which the larger DC shift component is superimposed and FIG. 13 shows one example of the detected signal. In FIGS. 12 and 13, the transverse axis represents the time and the longitudinal axis represents the output voltage.

The test signal as shown in FIG. 12 includes a pulsed positive signal SP5 having the amplitude Vp3 in the positive direction than the voltage V5 and a pulsed negative signal SN5 having the amplitude Vn3 in the negative direction than the voltage V5, in which the reference voltage is greatly DC shifted to the voltage V5 in the positive direction. For the test signal as shown in FIG. 12, the amplitude Vp3 of the positive signal SP5 and the amplitude Vn3 of the negative signal SN5 are equal.

For the detected signal as shown in FIG. 13, the reference detection level is greatly transferred to detection level D5, because the reference voltage of the test signal is greatly DC shifted. Therefore, even if amplitude Vp3 of positive signal SP5 of the test signal and amplitude Vn3 of negative signal SN5 are equal, detection level DPT5 corresponding to positive signal SP5 is greater than detection level DNT5 corresponding to negative signal SN5, and detection level DNT5 is lower than detection level D5.

Herein, a case is considered where a modulated signal in which the amplitude of the positive signal and the amplitude of the negative signal are equal is inputted into signal processing circuit 20 having an ideal circuit configuration in which no DC shift occurs.

In this case, level detector 30 detects the high frequency signal outputted from signal processing circuit 20 and outputs the detected signal. This detected signal is the signal in which the detection level of the detected positive signal corresponding to the positive signal of the modulated signal and the detection level of the detected negative signal corresponding to the negative signal are equal.

Similarly, if the test signal on which the DC shift component as shown in FIG. 7 is superimposed is inputted into signal processing circuit 20 having the ideal circuit configuration in which no DC shift occurs, the high frequency signal processed by signal processing circuit 20 is outputted. The high frequency signal outputted from signal processing circuit 20 is detected by level detector 30, so that the detected signal in which detection level DPT3 of detected positive signal DP3 and detection level DNT3 of detected negative signal DN3 are equal is outputted.

On the contrary, if the DC shift component is superimposed on the test signal or on a modulated signal due to some factor in signal processing circuit 20, or if the test signal or modulated signal on which the DC shift component as shown in FIG. 10 or 12 is superimposed is processed by signal processing circuit 20, the modulated signal as shown in FIG. 11 or 13 is outputted from level detector 30.

For the detected signal outputted from level detector 30, the level of the detected positive signal and the level of the detected negative signal are compared by level comparator 50. Level comparator 50 compares the level of the detected positive signal of the detected signal and the level of the detected negative signal to determine whether or not the level of the detected positive signal is lower than the level of the detected negative signal (step 1120), and outputs the determination result to offset adjuster 60.

Offset adjuster 60 generates an offset correction signal for correcting the test signal in the positive direction and outputs it to signal generator 10, if the level of the detected positive signal is lower than the level of the detected negative signal. Signal generator 10 corrects the DC shift component of the test signal in the positive direction, based on the offset correction signal (step 1130).

On the other hand, if the level of the detected positive signal is higher than the level of the detected negative signal, offset adjuster 60 generates an offset correction signal for correcting the test signal in the negative direction and outputs it to signal generator 10. Signal generator 10 corrects the DC shift component of the test signal in the negative direction, based on the offset correction signal (step 1135).

In the procedure as shown in FIG. 9, if it is determined at step 1120 that the level of the detected positive signal is equal to the level of the detected negative signal, the operation goes to step 1135, although offset adjuster 60 generates an offset correction signal for correcting the test signal and outputs it to signal generator 10. In this case, signal generator 10 outputs the test signal to signal processing circuit 20, without correcting the DC shift component of the test signal, based on the offset correction signal.

FIG. 14 shows one example of the test signal (or modulated signal) before and after the DC shift component in the negative direction is corrected and FIG. 15 shows one example of the detected signal before and after the DC shift component in the negative direction is corrected as shown in FIG. 14. In FIGS. 14 and 15, the transverse axis represents the time and the longitudinal axis represents the output voltage.

The test signal before correcting the DC shift component as shown in FIG. 14 includes a pulsed positive signal SP6 having amplitude Vp3 in the positive direction than voltage V6 and a pulsed negative signal SN6 having amplitude Vn3 in the negative direction than voltage V6, in which the reference voltage is DC shifted to voltage V6 in the negative direction. For the test signal as shown in FIG. 14, amplitude Vp3 of positive signal SP6 and amplitude Vn3 of negative signal SN6 are equal.

On the other hand, the test signal after offset correction includes a pulsed positive signal SP7 having amplitude Vp3 in the positive direction than voltage V7 and a pulsed negative signal SN7 having amplitude Vn3 in the negative direction than voltage V7, in which the reference voltage is corrected from voltage V6 to the voltage V7 in the positive direction. Amplitude Vp3 and amplitude Vn3 are identical to those of the test signal before offset correction.

Before correcting the DC shift component in the detected signal, as shown in FIG. 15, the reference detection level is transferred to detection level D6 because the reference voltage of the test signal has shifted. Therefore, there is a level difference LV6 between the detected positive signal DP6 corresponding to positive signal SP6 of the test signal and detected negative signal DN6 corresponding to negative signal SN6.

On the other hand, for the detected signal after offset correction, the reference detection level is transferred from the detection level D6 to detection level D7, because the reference voltage of the test signal was corrected in the positive direction from voltage V6 to voltage V7. Therefore, the level of detected negative signal DN7 corresponding to negative signal SN7 of the test signal falls, whereby level difference LV7 between detected negative signal DN7 and detected positive signal DP7 corresponding to positive signal SP7 of the test signal is smaller than level difference LV6 before correction.

FIG. 16 shows one example of the test signal (or modulated signal) before and after the DC shift component in the positive direction is corrected and FIG. 17 shows one example of the detected signal before and after the DC shift component in the positive direction as shown in FIG. 16 is corrected. In FIGS. 16 and 17, the transverse axis represents the time and the longitudinal axis represents the output voltage.

The test signal before correcting the DC shift component as shown in FIG. 16 includes a pulsed positive signal SP4 having amplitude Vp3 in the positive direction than voltage V4 and a pulsed negative signal SN4 having amplitude Vn3 in the negative direction than voltage V4, in which the reference voltage is DC shifted to voltage V4 in the positive direction. For the test signal as shown in FIG. 16, amplitude Vp3 of positive signal SP4 and amplitude Vn3 of negative signal SN4 are equal.

On the other hand, the test signal after offset correction includes a pulsed positive signal SP9 having amplitude Vp3 from voltage V9 and a pulsed negative signal SN9 having amplitude Vn3 from the voltage V9, in which the reference voltage is corrected in the negative direction from voltage V4 to voltage V9. The amplitude Vp3 and the amplitude Vn3 are identical to those of the test signal before offset correction.

Before correcting the DC shift component in the detected signal, as shown in FIG. 17, the reference detection level is transferred to detection level D4 because the reference voltage of the test signal has shifted. Therefore, there is a level difference LV4 between detected positive signal DP4 corresponding to positive signal SP4 of the test signal and detected negative signal DN4 corresponding to negative signal SN4.

On the other hand, for the detected signal after offset correction, the reference detection level is transferred from detection level D4 to detection level D9, because the reference voltage of the test signal is corrected in the negative direction from the voltage V4 to the voltage V9. Therefore, the level of detected negative signal DN9 corresponding to positive signal SN9 of the test signal falls, whereby level difference LV9 between detected positive signal DP9 and detected negative signal DN9 corresponding to negative signal SN9 of the test signal is smaller than level difference LV4 before correction.

In this manner, the test signal is inputted into signal processing circuit 20 and comparison is made between the detected positive signal and the detected negative signal of the detected signal outputted from level detector 30, whereby the DC shift component of the test signal is detected, and the offset correction is made so that the DC shift component of the test signal may be within a preset permissible range. Thereafter, the modulated signal is offset corrected so that the DC shift component detected using the test signal may be within the preset permissible range, thereby reducing the carrier leak caused by the DC shift component.

The amplitude of the detected signal outputted from level detector 30 as shown in FIG. 4 and the amplitude of the test signal outputted from signal generator 10 are not generally equal. This is because the test signal or modulated signal is amplified or attenuated through processing by signal processing circuit 20, whereby the detected signal is not necessarily obtained at the same level as the test signal or the modulated signal inputted into signal processing circuit 20.

Accordingly, offset adjuster 60 does not directly use the level difference (LV4 in FIG. 17 or LV6 in FIG. 15) between the detected positive signal and the detected negative signal obtained through the comparison process of level comparator 50 as the offset correction signal, but preferably decides the offset correction amount in consideration of the ratio of the amplitude of the test signal inputted into signal processing circuit 20 to the amplitude of the detected signal outputted from level detector 30.

By the way, when the offset correction is made in the positive direction or negative direction according to the DC shift component detected by level detector 30, there is a possibility that the DC shift component is left in the test signal as shown in FIGS. 14 to 17 because the offset correction is made only once in the procedure as shown in FIG. 9.

Referring to FIGS. 18 and 19, a procedure for further reducing the DC shift component that is superimposed on the test signal will be described below.

FIG. 18 is a flowchart showing a procedure for making the offset correction in units of minute amount $\Delta$. FIG. 19 is a flowchart showing a procedure for making the offset correction in units of minute amount $\Delta$ and updating the minute amount $\Delta$.

Processing from step 1100 to step 1120 as shown in FIGS. 18 and 19 is the same as that shown in FIG. 9, and its explanation is omitted.

In the procedure as shown in FIG. 18, as a result of comparing the levels between the detected positive signal and the detected negative signal of detected signal in level comparator 50, if it is determined that the level of the detected positive signal is lower than the level of the detected negative signal, offset adjuster 60 generates an offset correction signal for correcting the test signal in the positive direction by the minute amount $\Delta$ (step 1230), and outputs it to signal generator 10.

Also, if it is determined that the level of the detected positive signal is higher than the level of the detected negative signal in level comparator 50, offset adjuster 60 generates an offset correction signal for correcting the test signal in the negative direction by the minute amount $\Delta$ (step 1235), and outputs it to signal generator 10.

And offset adjuster 60 determines whether or not the offset correction process is ended (step 1250). If the offset correction process is not ended, the operation returns to step 1100 to repeat the processing from step 1100 to step 1235. The offset correction process may be ended, for example, if it is determined that the detected positive signal and the detected negative signal are equal in level comparator 50, or it is determined that the level difference between the detected positive signal and the detected negative signal is within the preset permissible range. If the level difference between the detected positive signal and the detected negative signal is coincident to the boundary of the preset permissible range, it should be decided whether the offset correction process should be ended or should be performed again.

If the offset correction process for the test signal is repeatedly performed in units of minute amount $\Delta$ as shown in FIG. 18, the DC shift component can be contained within the preset permissible range. Therefore, the DC shift component of the modulated signal is further decreased, whereby it is possible to reduce degradation in the communication quality due to a carrier leak caused by the DC shift component.

On the other hand, in the procedure as shown in FIG. 19, as a result of comparing the levels between the detected positive signal and the detected negative signal of the detected signal in level comparator 50, if it is determined that the level of the detected positive signal is lower than the level of the detected negative signal, offset adjuster 60 generates an offset correction signal for correcting the test signal in the positive direction by the minute amount $\Delta$ (step 1230), and outputs it to signal generator 10.

Also, if it is determined that the level of the detected positive signal is higher than the level of the detected negative signal in level comparator 50, offset adjuster 60 generates an offset correction signal for correcting the test signal in the negative direction by the minute amount $\Delta$ (step 1235), and outputs it to signal generator 10.

Then, offset adjuster 60 updates the preset value of minute amount $\Delta$ (step 1340). The minute amount $\Delta$ is reset to a smaller value, for example, if it is determined that the level difference between the detected positive signal and the detected negative signal is within the preset permissible range in level comparator 50, whereby the offset correction having a higher precision is allowed. When the minute amount $\Delta$ is updated, the permissible range for the level difference between the detected positive signal and the detected negative signal, which is used for determining whether or not the offset correction process is ended, may be further made narrower (smaller).

Subsequently, offset adjuster 60 determines whether or not the offset correction process is ended (step 1350). If the offset correction process is not ended, the operation returns to step 1100 to repeat the processing from step 1100 to step 1340. The offset correction process, like the process as shown in FIG. 18, may be ended, if it is determined that the detected positive signal and the detected negative signal are equal in level comparator 50, or if it is determined that the level difference between the detected positive signal and the detected negative signal is within the preset permissible range. Also, if the level difference between the detected positive signal and the detected negative signal is coincident to the boundary of the preset permissible range, it should be decided whether the offset correction process should be ended or should be performed again.

If the offset correction process for the test signal is repeatedly performed in units of minute amount $\Delta$ and the minute amount $\Delta$ is updated as shown in FIG. 19, the DC shift component is further decreased as compared with the process as shown in FIG. 18. Therefore, it is possible to further reduce degradation in communication quality due to a carrier leak caused by the DC shift component.

In the processes of FIGS. 18 and 19, the offset correction in the positive direction and the offset correction in the negative direction may be alternately performed when repeating the offset correction.

In this manner, the offset correction is repeated alternately in the positive direction and the negative direction, when the DC shift component occurs due to noise entering the signal processing device from the outside, for example. Also, when the offset correction amount is double the DC shift component, the offset correction may be repeated alternately in the positive direction and the negative direction.

In this case, it may be determined whether or not the offset correction is repeated alternately in the positive direction and the negative direction by storing the direction of offset correction (positive direction or negative direction) in a storage device, not shown, before determining (step 1350 in FIG. 18 or step 1350 in FIG. 19) that the offset correction is ended in offset adjuster 60, for example. If the offset correction is repeated alternately in the positive direction and the negative direction, the value of minute amount $\Delta$ may be changed, or the repetition interval of the offset correction process may be increased, for example.

According to this invention, the test signal in which the amplitude of the positive signal and the amplitude of the negative signal are equal is generated, the test signal is supplied to the signal processing circuit for making the frequency conversion of the modulated signal, the signal outputted from the signal processing circuit is detected, and the level of the detected positive signal and the level of the detected negative signal are compared to output the comparison result indicating which level of the detected positive signal and the detected negative signal is higher, whereby the DC shift component of the modulated signal can be detected without using the spectrum analyzer or the power amplifier for detection. Also, it is possible to reduce the power consumption of the circuit for making the level detection and offset correction.

Also, in the invention, the offset correction signal for making the level difference between the detected positive signal and the detected negative signal within the preset permissible range is generated based on the comparison result between the level of the detected positive signal and the level of the detected negative signal, and the offset of the modulated signal supplied from the outside is corrected in accordance with the offset correction signal, whereby the DC shift component of the modulated signal can be corrected using a simple configuration. By using the signal processing device of the invention, a communication system or communication terminal that have excellent communication quality can be obtained in which there is reduced carrier leakage in the transmitted signal.

FIRST EXEMPLARY EMBODIMENT

A first example of the signal processing device according to the invention will be described below with reference to the drawings.

An example of signal generator 10 as shown in FIG. 4 is shown in the first exemplary embodiment.

Signal generator 10 comprises signal source 110 for generating the test signal in which the amplitude in the positive direction and the amplitude in the negative direction are equal with respect to the reference voltage, condenser 120 for removing the DC component of the test signal, and coil 130 for superimposing the offset correction signal on the test signal, as shown in FIG. 20.

FIG. 20 only shows a function for generating the test signal, which signal generator 10 has, but if signal source 110 as shown in FIG. 20 is replaced with a terminal for inputting the modulated signal (base-band signal) supplied from the outside, a circuit for processing the modulated signal (base-band signal) is available.

From the test signal outputted from signal source 110, the DC component is removed by condenser 120. On the test signal outputted from condenser 120, the offset correction signal supplied from offset adjuster 60 is superimposed via input terminal T1 and coil 130 to provide the offset corrected test signal. The test signal after offset correction is outputted from output terminal T2 to signal processing circuit 20.

With this exemplary embodiment, it is possible to obtain the test signal used for detecting the DC shift component using the simple circuit as shown in FIG. 20, and thereby to correct the DC shift component occurring in the signal processing circuit, by using the test signal.

SECOND EXEMPLARY EMBODIMENT

A second exemplary embodiment of the signal processing device according to the invention will be described below with reference to the drawings.

An example of level comparator 50 as shown in FIG. 4 is shown in the second exemplary embodiment.

Level comparator 50 of this exemplary embodiment comprises positive signal level holding part 2810 for holding the detection level of the detected positive signal outputted from level detector 30, negative signal level holding part 2815 for holding the detection level of the detected negative signal outputted from level detector 30, and difference signal output part 2820 for outputting the comparison result of comparing the detection levels outputted from positive signal level holding part 2810 and negative signal level holding part 2815, as shown in FIG. 21.

Positive signal level holding part 2810 adopts in the level of the detected positive signal (e.g., detection level DPT4 of the detected positive signal DP4 as shown in FIG. 11) by using the positive signal of the test signal inputted from signal generator 10 or the signal generated from the positive signal (positive signal trigger), for example, and holds and outputs its value.

Negative signal level holding part 2815 adopts in the level of the detected negative signal (e.g., detection level DNT4 of the detected negative signal DN4 as shown in FIG. 11) by using the negative signal of the test signal inputted from signal generator 10 or the signal generated from the negative signal (negative signal trigger), for example, and holds and outputs its value.

The detection level of the detected positive signal outputted from positive signal level holding part 2810 and the detection level of the detected negative signal outputted from negative signal level holding part 2815 are usually DC voltage.

Difference signal output part 2820 compares the detection level of the detected positive signal outputted from positive signal level holding part 2810 and the detection level of the detected negative signal outputted from negative signal level holding part 2815, and outputs the comparison result.

The comparison result outputted from difference signal output part 2820 may be the determination result indicating which level of the detected positive signal and the detected negative signal is higher, or the difference in the voltage variance between the detected positive signal and the detected negative signal.

Difference signal output part 2820 for outputting the determination result may use a comparison means (comparator). In this case, if the level of the detected positive signal is lower than the level of the detected negative signal, a reverse output signal is outputted from the comparator, or if the level of the detected positive signal is higher than the level of the detected negative signal, a non-reverse output signal is outputted from the comparator, in which the comparison result is indicated in binary form.

Also, difference signal output part 2820 for outputting the difference in the voltage variance may be an arithmetic operation circuit such as an operation amplifier or subtracter.

With this exemplary embodiment, it is possible to implement level comparator 50 as shown in FIG. 4 using the simple circuit configuration as shown in FIG. 21.

THIRD EXEMPLARY EMBODIMENT

A third exemplary embodiment of the signal processing device according to the invention will be described below with reference to the drawings.

A specific example of level comparator 50 as shown in the second exemplary embodiment is shown in the third exemplary embodiment.

Level comparator 50 of this exemplary embodiment comprises first sample/hold circuit 3110 for holding and outputting the detection level of the detected positive signal outputted from level detector 30, second sample/hold circuit 3115 for holding and outputting the detection level of the detected negative signal outputted from level detector 30, and comparator 3120 for comparing the detection levels outputted from first sample/hold circuit 3110 and second sample/hold circuit 3115 to output the comparison result, as shown in FIG. 22.

First sample/hold circuit 3110 adopts in the level of the detected positive signal (e.g., detection level DPT4 of detected positive signal DP4 as shown in FIG. 11) by using the positive signal of the test signal generated by signal generator 10 or the signal generated from the positive signal (positive signal trigger), and holds and outputs its value.

Second sample/hold circuit 3115 adopts in the level of the detected negative signal (e.g., detection level DNT4 of the detected negative signal DN4 as shown in FIG. 11) by using the negative signal of the test signal inputted from signal generator 10 or the signal generated from the negative signal (negative signal trigger), and holds and outputs its value.

The detection level of the detected positive signal outputted from first sample/hold circuit 3110 and the detection level of the detected negative signal outputted from second sample/hold circuit 3115 are usually DC voltage.

Comparator 3120 compares the detection level of the detected positive signal outputted from first sample/hold circuit 3110 and the detection level of the detected negative signal outputted from second sample/hold circuit 3115 and outputs the comparison result.

Comparator 3120 outputs a reverse output signal, if the level of the detected positive signal is lower than the level of the detected negative signal, for example, or outputs a non-reverse output signal if the level of the detected positive signal is higher than the level of the detected negative signal.

With this exemplary embodiment, it is possible to implement level comparator 50 as shown in FIG. 4 using the simple circuit configuration as shown in FIG. 22.

FOURTH EXEMPLARY EMBODIMENT

A fourth exemplary embodiment of the signal processing device according to the invention will be described below with reference to the drawings.

Another example of level comparator 50 as shown in FIG. 4 is shown in the fourth exemplary embodiment.

Level comparator 50 of this exemplary embodiment comprises sample/hold circuit 3210 for adopting in the detection level of the detected positive signal outputted from level detector 30 and holding and outputting its value, and comparison means (comparator) 3220 for comparing the detection level outputted from sample/hold circuit 3210 and the detection level of the detected negative signal outputted from level detector 30 and outputting the comparison result, as shown in FIG. 23. Sample/hold circuit 3210 may adopt in, hold and output the detection level of the detected negative signal outputted from level detector 30.

Sample/hold circuit 3210 adopts in the level of the detected positive signal (e.g., detection level DPT4 of the detected positive signal DP4 as shown in FIG. 11) by using the positive signal of the test signal inputted from signal generator 10 or the signal generated from the positive signal (positive signal trigger), and holds and outputs its value. In the case where sample/hold circuit 3210 adopts in the detected negative signal, sample/hold circuit 3210 adopts in the level of the detected negative signal (e.g., detection level DNT4 of detected negative signal DN4 as shown in FIG. 11) by using the negative signal of the test signal inputted from signal generator 10 or the signal generated from the negative signal (signal trigger), and holds and outputs its value.

Comparator 3220 latches the comparison result between the detection level of the detected positive signal (detection level of the detected negative signal) outputted from sample/hold circuit 3210 and the detection level of the detected signal (signal generated from the difference between the detected positive signal and the detected negative signal) by using the negative signal (or positive signal) of the test signal, and outputs the comparison result when latched.

At this time, comparator 3220 outputs a reverse output signal if the level of the detected positive signal is lower than the level of the detected negative signal, or outputs a non-reverse output signal if the level of the detected positive signal is higher than the level of the detected negative signal, for example, as in the third exemplary embodiment.

According to this exemplary embodiment as shown in FIG. 23, one sample/hold circuit and one comparator can implement level comparator 50 as shown in FIG. 4. That is, level comparator 50 can be implemented using the simpler circuit configuration than in the second or third exemplary embodiment.

FIFTH EXEMPLARY EMBODIMENT

A fifth exemplary embodiment of the signal processing device according to the invention will be described below with reference to the drawings.

Another example of level comparator 50 as shown in FIG. 4 is shown in the fifth exemplary embodiment.

Level comparator 50 of this exemplary embodiment comprises A/D converter (analog/digital converter) 2910 for converting the detected signal outputted from level detector 30 into the digital signal, positive signal level register 2920 for holding the detection level (digital value) of the detected positive signal converted into the digital signal, negative signal level register 2925 for holding the detection level (digital value) of the detected negative signal converted into the digital signal, and subtracter 2930 for calculating the difference between the detection level of the detected positive signal outputted from positive signal level register 2920 and the detection level of the detected negative signal outputted from negative signal level register 2925 and outputting the calculation result, as shown in FIG. 24.

Positive signal level register 2920 adopts in the detection level (digital value) of the detected positive signal by using the positive signal of the test signal inputted from signal generator 10 or the signal generated from the positive signal (positive signal trigger), and holds and outputs its value.

Negative signal level register 2925 adopts in the detection level (digital value) of the detected negative signal by using the negative signal of the test signal inputted from signal generator 10 or the signal generated from the negative signal (negative signal trigger), and holds and outputs its value.

Subtracter 2930 subtracts the detection level of the detected negative signal outputted from negative signal level register 2925 from the detection level of the detected positive signal outputted from positive signal level register 2920, for example, and outputs the calculation result.

According to this exemplary embodiment, level comparator 50 can be realized by a digital circuit, but not an analog circuit as shown in the second to fourth exemplary embodiments.

SIXTH EXEMPLARY EMBODIMENT

A sixth exemplary embodiment of the signal processing device according to the invention will be described below with reference to the drawings.

An example of signal processing circuit 20 as shown in FIG. 4 is shown in the sixth exemplary embodiment.

The signal processing device of this exemplary embodiment has signal processing circuit 20 as shown in FIG. 4 with mixer 210 for making the frequency conversion, as shown in FIG. 25. The high frequency signal outputted from mixer 210 is sent via aerial wire 240, for example.

Mixer 210 mixes the modulated signal or test signal outputted from signal generator 10 and the local oscillation signal (local signal) generated by local oscillator 220 to convert the modulated signal or test signal into a high frequency signal for output.

In this case, since frequency conversion is made by mixer 210, the signal supplied from mixer 210 to level detector 30 is not the DC signal or low frequency signal but the signal having a specific high frequency component. Therefore, if level detector 30 has an envelope detector, for example, the level of the high frequency signal outputted from mixer 210 can be easily detected by envelope detection (envelope detector). The other configuration is the same as the configuration as described using FIGS. 4 to 24, and its explanation is omitted.

FIG. 26 shows a signal waveform before the offset correction processed by the signal processing device as shown in FIG. 25. FIG. 27 shows a signal waveform of the essential part after the offset correction.

FIG. 26A shows the local oscillation signal supplied to mixer 210, FIG. 26B shows the test signal or modulated signal inputted into mixer 210, FIG. 26C shows the high frequency signal outputted from mixer 210 and FIG. 26D shows the detected signal outputted from level detector 30.

Also, FIG. 27A shows the local oscillation signal supplied to mixer 210, FIG. 27B shows the test signal or modulated signal inputted into mixer 210, FIG. 27C shows the high frequency signal outputted from mixer 210, and FIG. 27D shows the detected signal outputted from level detector 30.

Since the test signal or modulated signal as shown in FIG. 26B is not offset corrected, the test signal (or modulated signal) is DC shifted in the positive direction. Therefore, the amplitude of the high frequency signal when modulated by the positive signal and the amplitude of the high frequency signal when modulated by the negative signal are different, as shown in FIG. 26C. As a result, the detected signal is not constant but fluctuates corresponding to the amplitude of the high frequency signal, as shown in FIG. 26D.

On the contrary, since the test signal or modulated signal as shown in FIG. 27B is offset corrected, the test signal (or modulated signal) is not DC shifted. Therefore, the amplitude of the positive signal and the amplitude of the negative signal are equal with respect to the reference voltage, whereby the amplitude of the high frequency signal corresponding to the positive signal and the amplitude of the high frequency signal corresponding to the negative signal are equal, as shown in FIG. 27C. As a result, the detected signal is constant corresponding to the amplitude of the high frequency signal, as shown in FIG. 27D.

In this manner, when there is a DC shift component, the detection level of the detected positive signal and the detection level of the detected negative signal of the detected signal outputted from level detector 30 are changed according to the positive signal and the negative signal, but if the offset correction is made to remove this change, the detection level of the detected positive signal and the detection level of the detected negative signal become the same level.

This shows a state where there is no DC shift component because the offset correction is excellently performed in the signal processing device, whereby it is possible to implement a communication system or communication terminal that has excellent communication quality in which there is no carrier leakage by using the signal processing device of this exemplary embodiment.

SEVENTH EXEMPLARY EMBODIMENT

A seventh exemplary embodiment of the signal processing device according to the invention will be described below with reference to the drawings.

An example of using a differential circuit for signal generator 10 as shown in FIG. 4 is shown in the seventh exemplary embodiment.

Usually, when the test signal as shown in FIG. 5 or 6 is outputted from signal generator 10, an output signal of a generation circuit for the pulse signal or an oscillator (oscillation circuit) for oscillating the sinusoidal signal is amplified by a power amplifier, not shown, for example, to obtain the test signal having the required amplitude.

Herein, in the case where test signal S1, in which the amplitude of the positive signal and the amplitude of the negative signal are equal with respect to the reference level (reference voltage), is outputted as the test signal from a pulse signal generation circuit, not shown, and amplified by the power amplifier, if the power amplifier operates as non-linear circuit 190 as shown in the Fig., test signal S2 in which the amplitude of the positive signal and the amplitude of the negative signal are different due to non-linearity of the circuit (power amplifier) is outputted at the output end of this non-linear circuit 190, even though test signal S1 in which the amplitude of the positive signal and the amplitude of the negative signal are equal is generated in the pulse signal generation circuit, as shown in FIG. 28.

For such test signal S2, since the amplitude of the positive signal and the amplitude of the negative signal are different, the detection level of the detected positive signal of the detected signal and the detection level of the detected negative signal are also different, whereby accurate offset correction can not be made.

A configuration example using a differential circuit (or a differential amplification circuit), for example, to output the test signal in which the amplitude of the positive signal and the amplitude of the negative signal are equal from signal generator 10 is shown in this exemplary embodiment.

FIG. 29 shows a signal waveform when generating the test signal using differential circuit 195.

Test signal S1 in which the amplitude of the positive signal and the amplitude of the negative signal are equal, which is generated by the pulse signal generation circuit, is inputted into two differential input transistors provided for differential circuit 195, as shown in FIG. 29. At this time, test signal S1 is inputted as signal S3 in phase with test signal S1 into one of the two differential input transistors provided for differential circuit 195, and inputted as signal s5 in opposite phase with test signal S1 into the other differential input transistor.

For the outputs of the two differential input transistors provided for differential circuit 195, signal S3 in phase with test signal S1 becomes signal S4 in which the amplitude of the positive signal and the amplitude of the negative signal are different, and signal S5 in opposite phase with test signal S1 becomes signal S6 in which the amplitude of the positive signal and the amplitude of the negative signal are different due to non-linearity of each differential input transistor.

Differential circuit 195 operates to compensate the non-linearity of signal S4 and signal S6 outputted from the two differential input transistors, and outputs test signal S7 in which the amplitude of the positive signal and the amplitude of the negative signal are equal.

In this manner, test signal S7 outputted from differential circuit 195 is the ideal test signal in which the amplitude of the positive signal and the amplitude of the negative signal are equal.

If offset correction is made using this test signal, the DC shift component which is superimposed on the test signal in signal processing circuit 20 can be detected accurately, whereby accurate offset correction can be implemented.

EIGHTH EXEMPLARY EMBODIMENT

An eighth exemplary embodiment of the signal processing device according to the invention will be described below with reference to the drawings.

A variation example of the signal processing device as shown in the sixth exemplary embodiment is shown in the eighth exemplary embodiment.

The signal processing device of the eighth exemplary embodiment has the configuration as shown in the sixth exemplary embodiment, to which frequency change inhibit part 230 is added, as shown in FIG. 30.

Frequency change inhibit part 230 inhibits the change for the oscillation frequency of the local oscillation signal outputted from local oscillator 220 from the time when the test signal is outputted from signal generator 10 to the time when the offset correction signal is generated in offset adjuster 60 and offset correction is made in signal generator 10.

By using this kind of frequency change inhibit part 230, the carrier frequency of the transmitting signal (high frequency signal) outputted from signal processing circuit 20 (mixer 210) is compulsorily inhibited from being changed, while offset correction is made.

In this manner, by compulsorily inhibiting the oscillation frequency of local oscillator 220 from being changed during offset correction, the signal processing device can eliminate the impact of an error in the DC shift component from occurring by changing the carrier frequency.

NINTH EXEMPLARY EMBODIMENT

A ninth exemplary embodiment of the signal processing device according to the invention will be described below with reference to the drawings.

FIG. 31 is a block diagram showing a configuration example of the signal processing device of the ninth exemplary embodiment.

The signal processing device of the ninth exemplary embodiment has transmitting base-band circuit 101 for generating the modulated signal and the test signal, transmitting circuit 201 for implementing the signal processing such as frequency conversion and power amplification for the output signal of transmitting base-band circuit 101 and sending it, receiving circuit 301 for implementing the signal processing such as frequency conversion and power amplification for the received signal and outputting it, receiving base-band circuit 302 for demodulating and outputting the signal outputted from receiving circuit 301, level comparator 50 for comparing the level of the demodulated signal outputted from receiving base-band circuit 302, offset adjuster 60 for generating an offset correction signal based on the level comparison of level comparator 50, and switch 70 for connecting or disconnecting between transmitting circuit 201 and receiving circuit 301, as shown in FIG. 31.

In the signal processing device of the ninth exemplary embodiment, the received signal is subjected to the frequency conversion and power amplification by receiving circuit 301, and demodulated in receiving base-band circuit 302 to generate the received base-band signal.

On the other hand, the transmitting base-band signal (transmitting modulated signal) outputted from transmitting base-band circuit 101 is subjected to frequency conversion and power amplification and sent by transmitting circuit 201.

The configuration as shown in FIG. 31 has the functions that the ordinary transmitter and receiver have, and the function of detecting the DC shift component and the offset correction function as described using FIG. 4.

In the signal processing device of this exemplary embodiment, transmitting base-band circuit 101 has the function of signal generator 10 as shown in FIG. 4, transmitting circuit 201 has the functions of signal processing circuit 20 and local oscillator 220 as shown in FIG. 4, and receiving circuit 301 and receiving base-band circuit 302 have the function of level detector 30 as shown in FIG. 4.

According to this configuration, the test signal outputted together with the transmitting base-band signal from transmitting base-band circuit 101 is subjected to high frequency signal processing in transmitting circuit 201, and outputted as a high frequency signal (i.e., transmitting signal) from transmitting circuit 201. Switch 70 is closed, while the high frequency signal including this test signal is being outputted, whereby the high frequency signal is attenuated, as needed, and inputted into receiving circuit 301.

The high frequency signal inputted into receiving circuit 301 is subjected to signal processing such as frequency conversion and power amplification, like the received signal, and inputted into receiving base-band circuit 302. The signal inputted into receiving base-band circuit 302 is demodulated, and the test signal is regenerated and subjected to envelope detection. That is, the high frequency signal including the test signal outputted from transmitting circuit 201 is inputted into receiving base-band circuit 302 and subjected to envelope detection.

The detected signal subjected to envelope detection is inputted into level comparator 50. Subsequently, the offset correction signal is inputted from offset adjuster 60 into transmitting base-band circuit 101 in accordance with the comparison result of level comparator 50, and the base-band signal after offset correction outputted from transmitting base-band circuit 101 is inputted into transmitting circuit 201, so that the high frequency signal is sent from transmitting circuit 201, as already described using FIGS. 4 and 9.

When the high frequency signal is sent from transmitting circuit 201, switch 70 is disconnected.

In this manner, by using receiving circuit 301 and receiving base-band circuit 302 as level detector 30 as shown in FIG. 4, the circuit for detecting the DC shift component and making the offset correction can be easily implemented without greatly increasing the number of parts. Therefore, by achieving the signal processing device of this exemplary embodiment, a small communication system or communication terminal can be realized.

The invention claimed is:

1. A signal processing device comprising:
a signal generator for generating a test signal including a positive signal having a first amplitude in a direction where the voltage is higher than a preset reference voltage and a negative signal having a second amplitude that is the same as said first amplitude in a direction where the voltage is lower than said reference voltage;
a signal processing circuit for implementing frequency conversion of said test signal or a modulated signal supplied from said signal generator;
a level detecting part for detecting a signal outputted from said signal processing circuit and outputting a detected signal including a detected positive signal corresponding to said positive signal and a detected negative signal corresponding to said negative signal;
a level comparator for comparing the level of said detected positive signal and the level of said detected negative signal to output the comparison result indicating which level of said detected positive signal and said detected negative signal is higher; and
an offset adjuster for generating an offset correction signal for making a level difference between said detected positive signal and said detected negative signal within a preset permissible range by shifting the reference voltage, based on the comparison result of said level comparator, wherein said signal generator makes the offset correction of the modulated signal in accordance with said offset correction signal supplied from said offset adjuster.

2. The signal processing device according to claim 1, wherein said level comparator comprises a positive signal level holding part for holding the level of said detected positive signal, a negative signal level holding part for holding the level of said detected negative signal, and a difference signal output part for outputting the comparison result of the comparison between the level of said detected positive signal held by said positive signal holding part and the level of said detected negative signal held by said negative signal holding part.

3. The signal processing device according to claim 1, wherein said level comparator comprises a first sample/hold circuit for holding the level of said detected positive signal by using the positive signal of said test signal or the signal generated from said positive signal, a second sample/hold circuit for holding the level of said detected negative signal by using the negative signal of said test signal or the signal generated from said negative signal, and a comparator for outputting the comparison result of the comparison between the level of said detected positive signal held by said first sample/hold circuit and the level of said detected negative signal held by said second sample/hold circuit.

4. The signal processing device according to claim 1, wherein said level comparator comprises a sample/hold circuit for holding the level of said detected positive signal or the level of said detected negative signal, and a comparator for outputting the comparison result of the comparison between the level of said detected positive signal and the level of said detected negative signal held by said sample/hold circuit or the comparison result of the comparison between the level of said detected negative signal and the level of said detected positive signal held by said sample/hold circuit.

5. The signal processing device according to claim 1, wherein said level comparator comprises an analog-digital converter for converting said detected signal of an analog value into a digital value, a positive signal level register for holding the level of the detected positive signal converted into said digital value, a negative signal level register for holding the level of the detected negative signal converted into said digital value, and a subtracter for outputting the difference between the level of said detected positive signal held by said positive signal level register and the level of said detected negative signal held by said negative signal level register.

6. The signal processing device according to claim 1, further comprising a local signal generator for generating a predetermined frequency signal used for said frequency conversion, and a frequency change inhibit part for inhibiting the frequency change of said frequency signal generated by said local signal generator.

7. The signal processing device according to claim 1, wherein said signal generator comprises a differential circuit.

8. The signal processing device according to claim 1, wherein said level detector detects the envelope of the signal outputted from said signal processing circuit.

9. A signal processing method comprising:
generating a test signal including a positive signal having a first amplitude in a direction where the voltage is higher than a preset reference voltage and a negative signal having a second amplitude that is the same as said first amplitude in a direction where the voltage is lower than said reference voltage;
supplying said test signal to a signal processing circuit for implementing the frequency conversion of a modulated signal, detecting a signal outputted from said signal processing circuit, and outputting a detected signal including a detected positive signal corresponding to said positive signal and a detected negative signal corresponding to said negative signal;
comparing the level of said detected positive signal and the level of said detected negative signal to output the comparison result indicating which level of said detected positive signal and said detected negative signal is higher; and
generating an offset correction signal for establishing the level difference between said detected positive signal and said detected negative signal within a preset permissible range by shifting the reference voltage based on said comparison result; and
making the offset correction of said modulated signal using said offset correction signal.

* * * * *